United States Patent [19]

Yasue et al.

[11] Patent Number: 4,819,187

[45] Date of Patent: Apr. 4, 1989

[54] SYSTEM FOR INTEGRALLY CONTROLLING AUTOMATIC TRANSMISSION AND ENGINE

[75] Inventors: Hideki Yasue; Kagenori Fukumura; Kunihiro Iwatsuki; Yoshio Shindo, all of Toyota, Japan

[73] Assignee: Toyota Jidosha Kabushiki Kaisha, Aichi, Japan

[21] Appl. No.: 945,501

[22] Filed: Dec. 23, 1986

[30] Foreign Application Priority Data

| Dec. 23, 1985 | [JP] | Japan | 60-290016 |
| Dec. 23, 1985 | [JP] | Japan | 60-290017 |
| Dec. 24, 1985 | [JP] | Japan | 60-291460 |
| Dec. 26, 1985 | [JP] | Japan | 60-293985 |
| Dec. 27, 1985 | [JP] | Japan | 60-295198 |
| Jan. 28, 1986 | [JP] | Japan | 61-16041 |
| Feb. 12, 1986 | [JP] | Japan | 61-28652 |
| Feb. 12, 1986 | [JP] | Japan | 61-28653 |

[51] Int. Cl.$^4$ ............. G05D 17/02; G06F 15/50
[52] U.S. Cl. ............. 364/431.01; 123/435; 364/424.1
[58] Field of Search ......... 364/424.1, 431.07; 74/861, 866, 867; 123/435

[56] References Cited

U.S. PATENT DOCUMENTS

| 3,895,541 | 7/1975 | Nohira et al. | 74/866 X |
| 4,208,929 | 6/1980 | Heino et al. | 74/866 |
| 4,262,335 | 4/1981 | Ahlen | 74/866 |
| 4,266,447 | 5/1981 | Heess et al. | 74/866 |
| 4,355,550 | 10/1982 | Will et al. | 74/866 |
| 4,370,903 | 2/1983 | Stroh et al. | 74/866 |
| 4,403,527 | 9/1983 | Mohl et al. | 74/866 |
| 4,523,281 | 6/1985 | Noda et al. | 364/424.1 |
| 4,543,934 | 10/1985 | Morita et al. | 123/435 |
| 4,556,942 | 12/1985 | Russo et al. | 364/431.07 |
| 4,635,508 | 1/1987 | Tatsumi | 74/866 |
| 4,643,048 | 2/1987 | Hattori et al. | 74/866 |
| 4,688,450 | 8/1987 | Hayashi et al. | 74/866 |
| 4,690,017 | 9/1987 | Taniguchi et al. | 74/866 |
| 4,703,428 | 10/1987 | Hosaka et al. | 364/424.1 |

FOREIGN PATENT DOCUMENTS 56-35857 4/1981 Japan.
56-39925 4/1981 Japan.

Primary Examiner—Felix D. Gruber
Attorney, Agent, or Firm—Parkhurst, Oliff & Berridge

[57] ABSTRACT

A system for integrally controlling an automatic transmission and an engine, wherein gear stages are automatically switched in accordance with a preset shift map, and an engine torque is changed by a predetermined change value during shifting to thereby maintain the satisfactory shift characteristics. The system includes a device for determining whether or not an engine torque change can be actually carried out without a problem; and means for regulating said engine torque change when said engine torque change cannot be actually carried out, to thereby prevent the problem from occurring.

21 Claims, 18 Drawing Sheets

FIG. 3

| SHIFT POSITION | | C1 | C2 | C0 | B1 | B2 | B3 | B0 | F1 | F2 | F0 |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | | ○ | | | ◎ | | ◎ |
| D | 3 | ○ | ○ | ○ | | ○ | | | | | ◎ |
| D | 4 | ○ | ○ | | | ○ | | ○ | | | |
| 2 | 1 | ○ | | ○ | | | | | | ◎ | ◎ |
| 2 | 2 | ○ | | ○ | ○ | ○ | | | ◎ | | ◎ |
| 2 | 3 | ○ | ○ | ○ | | ○ | | | | | ◎ |
| L | 1 | ○ | | ○ | | | ○ | | | ◎ | ◎ |
| L | 2 | ○ | | ○ | ○ | ○ | | | ◎ | | ◎ |

SYSTEM FOR INTEGRALLY CONTROLLING AUTOMATIC TRANSMISSION AND ENGINE

BACKGROUND OF THE INVENTION

Field of the Invention

This invention relates to a system for integrally controlling an automatic transmission and an engine. More particularly it relates to improvements in a system for controlling an automatic transmission and an engine, wherein gear stages are automatically switched in accordance with a preset shift map, and engine torque is changed by a predetermined value during shifting to maintain satisfactory shift characteristics.

Automatic transmissions are known to include gear transmission mechanisms, a plurality of frictionally engaging devices, and hydraulic pressure control devices operated to selectively switch the engagements of the frictionally engaging devices, so that any one of a plurality of gear stages can be achieved in accordance with a preset shift map.

Furthermore, in an automatic transmission for a vehicle, of the type described, various systems are known for integrally controlling an automatic transmission and an engine, wherein, engine torque is changed during shifting to obtain satisfactory shift characteristics and durability of the frictionally engaging devices (For example, Japanese Patent Laid-Open No. 69738/1980). More specifically, the system for integrally controlling the automatic transmission and the engine, of the type described intends to change the amount of torque transmitted from the engine during shifting and control the amount of energy absorbed by various members in the automatic transmission or by the frictionally engaging devices so as to complete a shifting within a short period of time under a low shift shock, whereby a satisfactory shift feeling is given to a driver and durability of the frictionally engaging devices is improved.

However, when the control for changing engine torque cannot be carried out due to trouble in a sensor system or a request from the engine side, durability of the frictionally engaging devices is reduced due to an increase in the amount of energy absorbed by the frictionally engaging devices in the automatic transmission. Moreover, a shifting time duration is prolonged therefore worsening the shift feeling. This is caused by the shift tuning data (oil pressure and the like) in the automatic transmission being set in expectation of a decrease in the engine torque by a predetermined value during the shifting.

More specifically, a timing for changing engine torque, when it is an upshift, is needed immediately after the start of an actual change in rotary speed of a rotary member in the automatic transmission. In order to detect this accurately, it is necessary to detect a change in engine rotary speed, in rotary speed of the rotary member in the automatic transmission, or a rise in oil pressure in a hydraulic pressure control device (Japanese Patent Application Nos. 234466/1984 and 272609/1984, not prior art). If trouble occurs in a sensor system which detects said changes, control timing is retarded, and the shift characteristics deteriorate to a considerable extent, or no engine torque change is performed. As a result, durability of the frictionally engaging devices which are set in expectation of a decrease of engine torque is reduced.

When ignition timing is delayed for changing (decreasing) engine torque and the delay is carried out immediately after the cold start of the engine, misfiring, or in extreme case, engine stalling tend to occur because the ignition timing is set behind an optimal timing. Further, when the engine temperature is low and a fuel feed quantity and an intake air flowrate are decreased to decrease engine torque misfiring might occur.

Furthermore, when ignition timing is delayed for changing (decreasing) engine torque, an increase occurs in so-called after-burn, which is caused by an exhaust valve opened before gaseous mixture completely burn in engine cylinders due to the delay of ignition timing. As a result, such a problem is presented that high temperature gas is exhausted into an exhaust pipe, whereby temperature of an exhaust system (exhaust gas temperature, catalyst temperature, exhaust pipe temperature and the like) rises. Sometimes, depending on the type of shifting, the control increases the engine torque. In this case, increasing the feed fuel quantity or the intake air flowrate, changes (increases) engine torque for example, the temperature of the exhaust system is raised. The rise in the temperature of the exhaust system caused by changes in engine torque during shifting as described above presents no problem, as long the shift frequency is normal.

However, when the shift frequency is high, the temperature of the exhaust system rises to a tolerance value or more, therefore reducing the durability of an exhaust manifold. Further, in an engine system having a turbocharger, there is a possibility of causing an adverse effect on the turbine blades on the exhaust side. If the feed fuel quantity and the intake air flowrate are frequently decreased to reduce engine torque, there is a possibility of causing engine misfire, deterioration of exhaust gas ingredients and the like.

Consequently, the above-described disadvantages are avoided, when the shift frequency is high, by designing routines relating to engine torque control, by setting a map of an engine torque change value and the like.

Furthermore the above-described disadvantages are avoided even when an engine torque control for shifting is performed when the engine temperature is low by designing routines relating to the engine torque control, by setting of a map of an engine torque change value and the like.

However, a lag angle value of ignition timing is set, at a value rather low from the above-described viewpoint for example, a lowered value of engine torque should naturally be obtained, thus presenting such a problem that the proper purpose of control for improving the shift characteristics including durability of the frictionally engaging devices cannot be satisfactorily displayed.

If in the above-described system means for controlling the engine, means for controlling the automatic transmission, and further, means for controlling the engine torque change are formed integrally with one another, then such problems are presented that the capacity of the computer is increased which leads to increased costs, and it is disadvantages to mount it onto a vehicle having many restrictions for space capacity. Furthermore, there are cases where the engine torque control is not needed in relation to uphill or downhill grade, in relation to magnitude of engine output, and, in the case of taking into account the properties of wide application, the integral type may be disadvantageous. Now, if these control means are of a distributed type, as the case may be, such as possibilities occur that the number of connections for connecting the means to one another is increased to make wirings complicated, or disadvantages from a failsafe viewpoint are presented.

SUMMARY OF THE INVENTION

The present invention has been developed to obviate the above-described disadvantages of the prior art. The present invention has as its object the provision of a system for integrally controlling an automatic transmission and an engine, wherein, only in the case where a problem occurs when engine torque change control is carried out, the engine torque change control is regulated, to thereby prevent the problem from occurring.

More specifically, the present invention has been developed to obviate the above-described disadvantages of the prior art and has as its object the provision of a system for integrally controlling an automatic transmission and an engine, wherein, even when trouble occurs in a sensor system for determining timing of an engine torque control, such problems are avoided that an engine torque change is performed during an unexpected period of time to unexpectedly deteriorate shift characteristics to a considerable extent, or no engine torque change is performed to lower the durability of the frictionally engaging devices, due to the trouble.

And more specifically, the present invention has been developed to obviate the above-described disadvantages of the prior art and has as its object the provision of a system for integrally controlling an automatic transmission and an engine, wherein, only when there is a possibility of a problem actually occurring, a countermeasure is directly taken, thereby the setting value is selected more freely, and, in the normal conditions, the proper function of an engine torque control can be satisfactorily displayed.

To achieve the above-described object, a first embodiment of the invention contemplates a system for integrally controlling an automatic transmission and an engine, wherein gear stages are automatically switched in accordance with a preset shift map and engine torque is changed by a predetermined change value during shifting to thereby maintain satisfactory shift characteristics. The system includes: means for determining whether conditions exist such that said engine torque cannot be changed in accordance with said predetermined change value; and means for regulating an engine torque change when said conditions are determined to exist.

To achieve the above-described object, a second embodiment of the invention contemplates a system for integrally controlling an automatic transmission and an engine, including: means for controlling the engine; means formed separately from the engine control means, for controlling the automatic transmission; means formed integrally with the engine control means, for inputting shift information from the automatic transmission control means, and for performing engine torque change control; and at least one first information transmitting means for informing from the engine control means to the automatic transmission control means that engine torque change is stopped or restricted, and second information transmitting means for informing from the automatic transmission control means to the engine control means that a signal sensor system for performing the engine torque change control to be carried out is in trouble.

In the first embodiment, even with a shifting, for which engine torque control should properly be performed, judgment is still made as to whether engine torque control had better not be actually carried out due to some reason such as a trouble in the sensor system, a request from the engine side or the like, and, when it is judged that the engine torque change had better not be performed, the engine torque change is regulated, so that the above-described disadvantages caused by performing the engine torque change can be avoided.

As a consequence, there is no need for imposing restrictions for avoiding occurrences of the above-described disadvantages in designing routines for engine torque control, in setting a torque change value, or the like, so that the engine torque control has a high degree of the freedom.

On the other hand, in the second embodiment, the engine control means and the automatic transmission control means are formed separately of each other, whereby the automatic transmission control means can principally control only the automatic transmission irrespective of the pressure of the engine torque control, so that the general-purpose properties can be improved accordingly.

In addition to the above, the torque control means for carrying out engine torque change control and the engine control means are formed integrally with each other, whereby wirings relating to timing, and change value of the torque change, various factors for controlling the change value, and the like can be dispensed with, so that effective design and mounting can be performed. More specifically, the engine control means should control an engine rotary speed, and, has a function capable of desirably controlling actuators for controlling an ignition timing, a fuel injection flowrate and the like. Because of this, when torque change is performed, there is no need for providing new wirings between these actuators and command circuit systems thereof, whereby the mounting is easily performed and troubles hardly occur. Further, when engine torque change is performed, a so-called limitation for protecting is applied in proportion to exhaust gas temperature, battery voltage, engine water temperature or the like. In this case, in general, the engine control means has input terminals for applying the limitation. Because of this, there is no need for providing guard terminals for the torque change control.

Additionally, when the engine control means and the automatic transmission control means are formed separately of each other, if the engine control means does not recognize shift information of the automatic transmission, then there is a possibility of that the engine control means performs torque change during no shifting. However, in this second embodiment, shift information of the automatic transmission from the automatic transmission control means is transmitted to the torque control means (engine control means), unless the engine control means recognizes shift information from the automatic transmission control means, the engine control means does not carry out the torque change.

Furthermore, in this second embodiment, more reliable and stabilized operation can be expected from the viewpoint of so-called failsafe. For example, as described above, these are cases where the engine control means cannot stop or restrict the engine torque control during shifting from a request of the engine control means itself. These cases include a case where fixed spark advance control is performed due to occurrence of trouble in an engine rotary speed sensor system, a case where a lag angle value is limited during low water temperature and the like. In these cases, the automatic transmission control means can recognize the circumstances of the type described above through the first information transmitting means capable of making contact from the engine control means to the automatic transmission control means that the engine torque change is stopped or restricted. As a result, such a countermeasure can be taken that a shift point can be changed to a lower one and the like, for example, so that such a disadvantage can be avoided that occurs due to the fact that the engine torque change control is not performed in accordance with a schedule.

There is a case where a request to stop engine torque change control is made from the automatic transmission control means to the torque control means (engine control means). For example, this is the case where a trouble occurs in a solenoid system for carrying out a shifting, in a vehicle speed detecting system or the like. In these cases, the engine control means can recognize the circumstances of the type described above through the second information transmitting means capable of making contact from the automatic transmission control means to the engine control means that a signal sensor system for carrying out the torque change control is in trouble.

Further, according to the second embodiment, the aspect can be developed into a so-called conversation control, wherein, for example, information that a lag angle value is limited due to low engine cooling water is transmitted from the engine control means to the automatic transmission control means, and the shift point is changed to a rather low one on the basis of this information, in the automatic transmission control means. Thereafter, the fact that the shift point is changed is transmitted again to the engine control means, and the torque change is actually started by the engine control means after this information is received.

A preferred embodiment is an arrangement that the system according to the present invention further includes: means for detecting whether the sensor system for determining a timing of the engine torque change is in trouble or not; wherein the means judges that the engine torque change cannot actually be carried out when the sensor system is in trouble.

With this arrangement, it can be avoided that shift characteristics are deteriorated due to deviated torque change timing.

Another preferred embodiment is an arrangement that the system according to the present invention further includes: means for detecting the warm-up state of the engine; wherein the means judges that the engine torque change cannot actually be carried out when the engine is not warmed up.

With this arrangement, engine torque control during shifting, which may cause misfire, can be prevented from being performed.

Incidentally, the fact that the engine is warmed up or not can be detected when the engine cooling water temperature or engine body temperature reaches a predetermined value.

A further preferred embodiment is an arrangement that the system according to the present invention further includes: means for counting the number of the engine torque changes; wherein the means judges that the engine torque change cannot actually be carried out when the counted value within a defined period of time exceeds a predetermined number.

With this arrangement, disadvantages, particularly, rise in exhaust gas temperature and deteriorated exhaust gas ingredients occurring due to the frequent engine torque controls can be avoided.

A still further preferred embodiment is of such an arrangement that the system according to the present invention, further includes:

means for detecting an elapsed time after the engine torque change; wherein the means for judging judges that the engine torque change cannot be actually carried out until the elapsed time reaches a predetermined time.

With this arrangement, similar to the above, the disadvantages can be avoided, particularly, rise in exhaust gas temperature and deteriorated exhaust gas ingredients occurring due to the frequent engine torque controls.

A yet further preferred embodiment is an arrangement that the system according to the present invention further includes: means for detecting a time interval between the engine torque changes; wherein the means for judging judges that the engine torque change cannot actually be carried out when engine torque changes, each having a time interval shorter than a predetermined period of time, are repeated a predetermined number of times.

With this arrangement, similar to the above, the disadvantages can be avoided, particularly, rise in exhaust gas temperature and deteriorated exhaust gas ingredients occurring due to the frequent engine torque controls.

A still further preferred embodiment is an arrangement that the system according to the present invention further includes: means for determining whether or not the engine is over heated; wherein the means for judging judges that the engine torque change cannot actually be carried out when the engine is determined to be overheated.

With this arrangement, similar to the above, the disadvantages can be avoided, particularly, rise in exhaust gas temperature and deteriorated exhaust gas ingredients occurring due to the frequent engine torque controls.

A still further preferred embodiment is of such an arrangement that the means for determining whether the engine is overheated or not determining whether or not the engine cooling temperature reaches a predetermined value or more.

With this arrangement, the overheat of the engine can be easily and accurately detected in response to a signal outputted from an engine cooling water temperature sensor commonly used.

Additionally, in this case, the predetermined value is set immediately at or somewhat before the overheat. To determine whether or not the engine is overheated, temperature of the engine body may be directly detected except for the above.

A still further preferred embodiment is an arrangement that the means for regulating the engine torque change is a means for prohibiting the engine torque change. With this arrangement, disadvantages occurring due to the fact that the most direct engine torque changes are frequently carried out can be avoided.

A still further preferred embodiment is an arrangement that the means for regulating the engine torque change is a means for controlling the predetermined value (a change value of engine torque).

Further, the means for regulating the engine torque change is one for shortening a period of time for carrying out the engine torque change.

Further, the means for regulating the engine torque change is a means for changing performing regions of various parameters for performing the engine torque change.

Further, one of the various parameters is the throttle opening.

Further, one of the various parameters is the type of shifting.

For an engine torque change, in general, a change value or a period of time for performing the change is determined in proportion to the throttle opening and the like, for example. The present invention does not limit the means for regulating the engine torque change, and, the means for regulating the engine torque change may be one for controlling the engine torque change value or one for shortening a period of time for performing the engine torque change, for example, except for one for entirely stopping the engine torque change. Further, the engine torque change is normally performed when the throttle opening reaches a predetermined value or more, for example. However, this engine torque change may be replaced by one for changing the performing region (in this case, a region where the throttle opening reaches the predetermined value or more). Furthermore, the engine torque change may be replaced by one for changing the performing region in accordance with the type of shift (the torque exchange is regulated only during a specific shift).

A still further preferred embodiment is an arrangement that a signal for performing the regulation of the engine torque change is identical with an overdrive cancel signal for prohibiting an overdrive during low temperature. The reason why the overdrive is prohibited during low temperature is that the engine rotary speed is maintained at a comparatively high level, the drivability is improved accordingly, and the warm-up is facilitated. The so-called overdrive cancel signal for prohibiting the overdrive during low temperature is adopted to be released when the warm-up is advanced, so that the time of establishment thereof may be thought of being substantially coinciding with the time of establishment of the signal for performing the regulation of the engine torque change during low temperature. As a consequence, these signals are made identical with each other, so that the construction can be simplified accordingly.

A still further preferred embodiment is an arrangement that the system according to the present invention further includes means for issuing a warning during the regulation of the engine torque change.

With this arrangement, a driver can be quickly informed of the current abnormality.

A still further preferred embodiment is an arrangement that the system according to the present invention of further includes: means for recognizing a cause of that the engine torque change cannot be actually carried out and; means for issuing a warning having a content corresponding to the recognized cause.

With this arrangement, the driver can take the most suitable countermeasure.

A still further preferred embodiment is an arrangement that the system according to the present invention further includes: means for changing a shift point of the shift map; and means for changing the shift point to a lower one during the regulation of the engine torque change.

More specifically, when the engine torque change control is merely regulated, another problem occurs on the automatic transmission side. Namely, on the automatic transmission side for example, since the shift tuning data such as oil pressure are set in expectation of decreased engine torque, when the torque decrease is not made during shifting where an engine torque should be decreased, such problems occur that durability of the frictionally engaging devices is deteriorated, and moreover, the shift time duration is prolonged to worsen the shift feeling.

When the engine torque change is regulated, if the shift point is changed to a lower one, then the heat load of the frictionally engaging devices can be decreased, lowered durability of the frictionally engaging devices can be avoided, the shift time duration can be shortened, and worsened shift feeling can be avoided. Further, improved fuel consumption rate due to the low set shift point can be expected as well.

A still further preferred embodiment is an arrangement that change of the shift point is selection of another map where the shift point is set to a lower one. With this arrangement, change of the shift point can be accurately and rapidly performed.

A still further preferred embodiment is an arrangement that the system according to the present invention further includes: timer means capable of counting a predetermined period of time; and means for causing the regulation of the engine torque change to continue at least for the predetermined period of time.

With this arrangement, the engine torque change control can be restarted in a state where a condition, in which the engine torque change control may be performed, is restored to some extent.

BRIEF DESCRIPTION OF THE DRAWINGS

The above object, features and advantages of the present invention, as well as other objects and advantages thereof, will become more apparent from the description of the invention which follows, taken into conjunction with the accompanying drawings, wherein like reference characters designate the same or similar parts and wherein:

FIG. 3 is a chart showing actuated positions of frictionally engaging devices at every gear stages of the above-mentioned system;

DESCRIPTION OF THE PREFERRED EMBODIMENTS

The present invention will be described in detail with reference to the accompanying drawings which illustrate preferred embodiments of the present invention.

Figure 1:
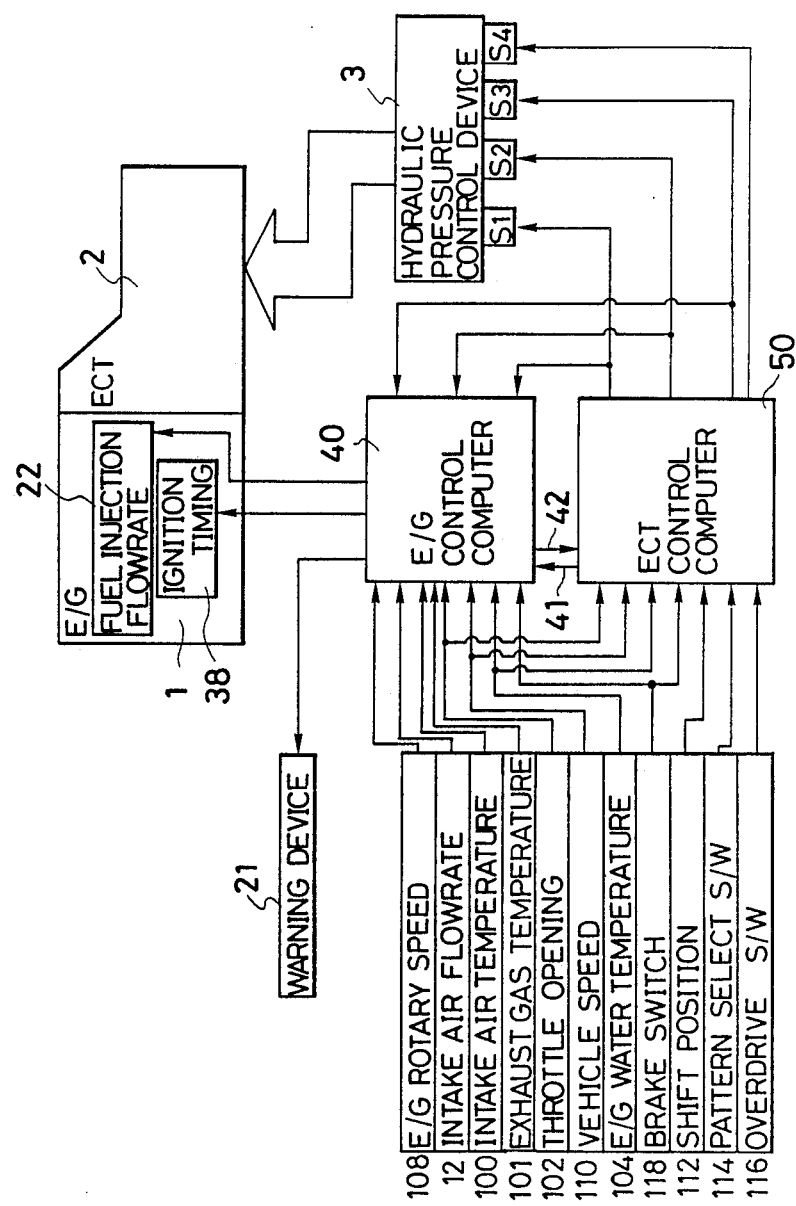
FIG. 1 is a schematic block diagram showing the general arrangement of a first embodiment of the system for integrally controlling an automatic transmission and an engine according to the present invention.

FIG. 1 is a block diagram showing the general arrangement of the system for integrally controlling an automatic transmission and an engine, to which the present invention is adopted.

An engine 1 and an automatic transmission 2 are well known. In the engine 1, fuel injection flowrate at an injector 22 and an ignition timing at a distributor 38 are controlled by an engine control computer 40, so that engine output in proportion to an opening anlge of accelerator pedal and engine rotary speed can be obtained. In the automatic transmission (hereinafter referred to as "ECT") 2, electromagnetic valves S1-S4 are controlled by an automatic transmission control computer (hereinafter referred to as "ECT control computer"), and oil pressure in the lines of the hydraulic pressure control device are changed whereby the engagements of frictionally engaging devices are selectively changed, so that a vehicle speed and throttle opening angle commensurate to a gear stage can be obtained.

More specifically, inputed into the engine control computer 40 are signals of: engine rotary speed from an engine rotary speed sensor (crank angle sensor) 108; intake air flowrate from an air flow meter 12; intake air temperature from an intake air temperature sensor 100; exhaust gas temperature from exhaust gas temperature sensor 101; throttle opening from a throttle sensor 102; vehicle speed from a vehicle speed sensor 110; engine water temperature from a water temperature sensor 104; and brake-ON signal from a brake switch 118. The engine control computer 40 determines the fuel injection flowrate and the ignition timing in response to the above-mentioned signals. Furthermore, parallelly inputted into this engine control computer 40 are solenoid signals of the electromagnetic valves S1-S4 ON-OFF controlled by the ECT control computer 50, whereby shift timing of the automatic transmission is judged.

On the other hand, inputted into the ECT control computer 50 are signals from: the throttle sensor 102; the vehicle speed sensor 110; the water temperature sensor 104; the brake switch 118, etc., and further, signals of: position of a shift lever from a shift position sensor 112; running selection patern such as a "fuel efficiency mode" and "high performance mode" from a pattern select switch 114; permission of a shift to overdrive from an overdrive switch 116; whereby the electromagnetic valves S1-S4 is ON-OFF controlled, so that a gear stage commensurate to the vehicle speed and the opening angle of accelerator pedal can be obtained.

Here, the ECT control computer 50 and the engine control computer 40 can interchange information through communication lines 41 and 42.

Figure 2:
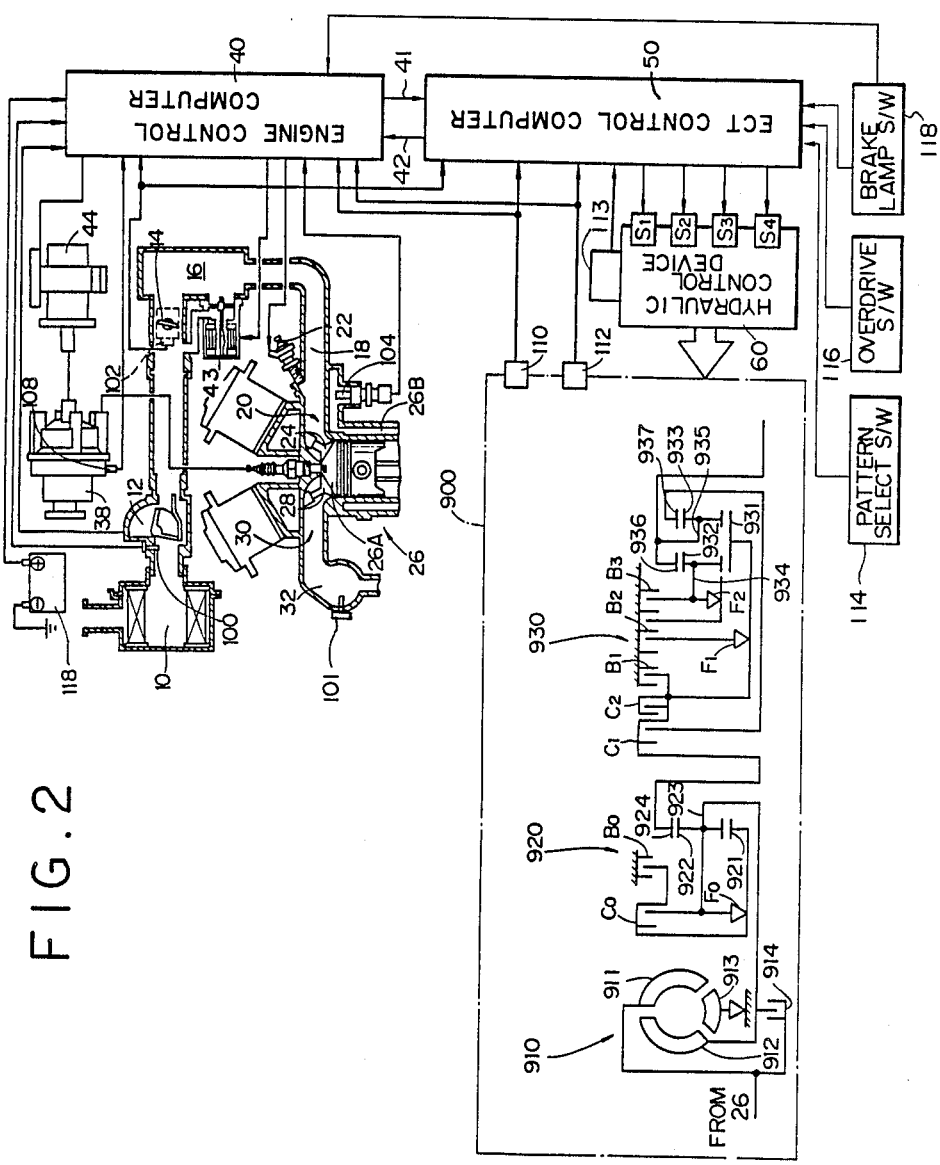
FIG. 2 is a sectional view, partially including a block diagram, showing a specific arrangement of the above-mentioned system.

FIG. 2 more specifically shows the system in the above embodiment.

Air taken into an air cleaner 10 is successively delivered to an air flow meter 12, an intake throttle valve 14, a surge tank 16 and an intake manifold 18. This air is mixed with fuel injected from an injector 22 in the proximity of an intake port 20, and further, delivered to a combustion chamber 26A of a main body 26 of the engine through an intake valve 24. The exhaust gas produced from the combustion of an air-fuel mixture in the combustion chamber 26A is exhausted to the atmosphere through an exhaust valve 28, an exhaust port 30, an exhaust manifold 32 and an exhaust pipe (not shown).

An intake-air temperature sensor 100 is provided in the air flow meter 12, for detecting intake air temperature. An exhaust gas temperature sensor 101 is provided in the exhaust manifold 32, for detecting exhaust gas temperature of the engine. The intake throttle valve 14 rotates in association with an accelerator pedal (not shown), which is provided at the driver's seat. A throttle sensor 102 is provided in the intake throttle valve 14, for detecting a throttle opening degree thereof. A water temperature sensor 104 is provided in a cylinder block 26B of the main body 26 of the engine, for detecting an engine cooling water temperature. A crank angle sensor 108 is provided in a distributor 38 which has a shaft rotatable by a crankshaft of the main body 26 of the engine, for detecting a crank angle from the rotation of the shaft.

In the ECT, a vehicle speed sensor 110 for detecting the vehicle speed from the rotation speed of an output shaft thereof, and a shift position sensor 112 for detecting a shift position are provided. Outputs from these sensors 100, 101, 102, 104, 108, 110 and 112, further outputs from the pattern select switch 114, the overdrive switch 116, and the brake lamp switch 118 are inputted to an engine control computer 40 and/or ECT control computer. The engine control computer 40 calculates fuel injection flowrate and the optimum ignition timing by using the input signals from the sensors as parameters, and controls the injector 22 so that fuel commensurate to said fuel injection flowrate can be injected, and controls the ignition coil 44 so that the optimum ignition timing can be obtained.

Additionally, idle rotation speed control valve 43 driven by a step motor is provided in a bypass passage intercommunicating the upstream side of the throttle valve 14 with the surge tank 16, whereby idle rotation speed is controlled in response to a signal from the engine control computer 40.

On the other hand, a transmission section 900 of the ECT in this embodiment includes a torque converter 910, an overdrive mechanism section 920 and an underdrive mechanism section 930.

The torque converter 910 includes a well-known pump 911, a turbine 912, a stator 913 and a lockup clutch 914.

The overdrive mechanism section 920 includes a set of planetary gears including a sun gear 921, a planetary pinion 922 being in mesh with the sun gear 921, a carrier 923 supporting the planetary pinion 922 and a ring gear 924 being in mesh with the planetary pinion 922. The rotating conditions of the planetary gear is controled by a clutch Co, a brake Bo and a one-way clutch Fo.

The underdrive mechanism section 930 includes two sets of planetary gears including a common sun gear 931, planetary pinions 932 and 933, which are in mesh with the sun gear 931 respectively, carriers 934 and 933, which support the planetary pinions 932 and 933 respectively, and ring gears 936 and 937, which are in mesh with the planetary pinions 932 and 933 respectively. The rotating conditions of these two sets of planetary gears and connecting conditions to overdrive mechanism section 920 are controlled by clutches C1 and C2, brakes B1–B3 and one-way clutches F1 and F2. Since the connected state of the respective component parts of this transmission 900 is well known, only the skelton diagram is shown in FIG. 2 and detailed description will be omitted.

In this embodiment, electromagnetic valves S1–S4 in a hydraulic control circuit 60 are driven and controlled in accordance with a preset shift point map by an ECT control computer inputted thereto with signals from the throttle sensor 102, the vehicle speed sensor 110 and so forth. As a result, combination of the clutches, brakes and the like is made as shown in FIG. 3, so that the shift control can be performed.

Additionally, marks ○ in FIG. 3 indicate the operated positions and marks ⊙ indicate the operated positions only when the engine is powered on (when the engine torque is transmitted to the wheels, i.e., when the engine brake does not operate).

In the system of the type described, the engine control computer 40, receiving shift information (shift judgment, shift command, lockup clutch engagement permission and the like) from the ECT control computer 50, performs the engine torque control.

More specifically, in this system, a timing of engine torque change and engine torque down valve are determined by the engine control computer 40. When the sensor system is in trouble, the engine torque down is stopped, and this fact is transmitted to the ECT control computer 50 through communication line 41. Furthermore, in this case, a warning to the effect that the torque down is stopped is issued.

On the other hand, the ECT control computer 50 delivers outputs to the electromagnetic valves S1–S4, i.e. shift outputs to the engine control computer 40 through a communication line 42, to thereby make the engine computer 50 recognize the shift outputs. Furthermore, upon receiving the indication the engine torque down is stopped, the ECT control computer 50 transfers a shift point to a lower one.

Figure 4:
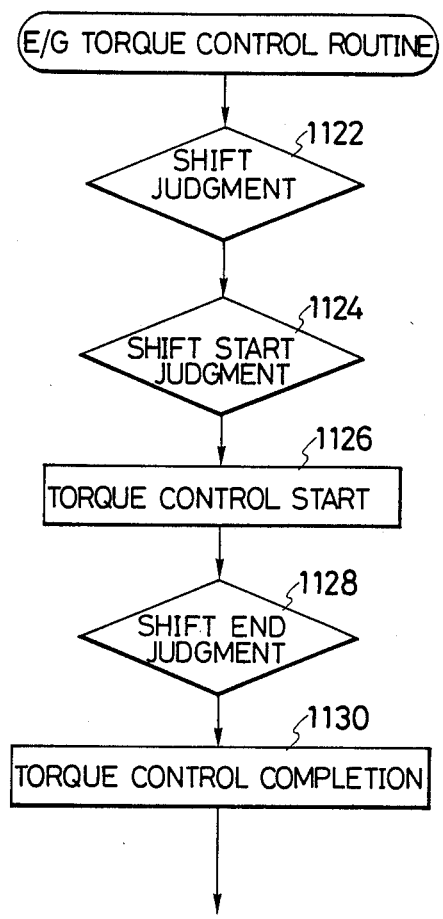
FIG. 4 is a flow chart showing the outline of the torque change control routine adopted in the above-mentioned system.

FIG. 4 is a flow chart showing the outline of integral control of the engine and the automatic transmission.

In a control routine of the engine control computer 40, when generation of a shift is determined from a signal change in the electromagnetic valves S1–S4 (Step 1122), thereafter in Step 1124, the actual start of the shift is judged at a time at which the engine rotary speed is changed (for example, when it is an upshift, the engine rotary speed is lowered). An engine torque change is started in accordance with a torque change value predetermined by the type of shifting, a throttle opening and the like (Step 1126). Specifically, the torque change is carried out by lag angle control, control of the fuel injection flowrate and the like. As the shifting advances, and, when the engine rotary speed Ne is changed to the engine rotary speed NeA, obtained by adding a predetermined value (a negative number is included) to the engine rotary speed NeB at the time of completion of a shifting, the engine rotary speed NeB being determined from a rotary speed of an ECT output shaft and a gear ratio, the completion of the shift is judged (Step 1128). Then, the engine torque is returned relatively slowly taking a predetermined period of time (Step 1130).

The above-described control will hereunder be described in detail with reference to FIGS. 5 and 6.

Figure 5:
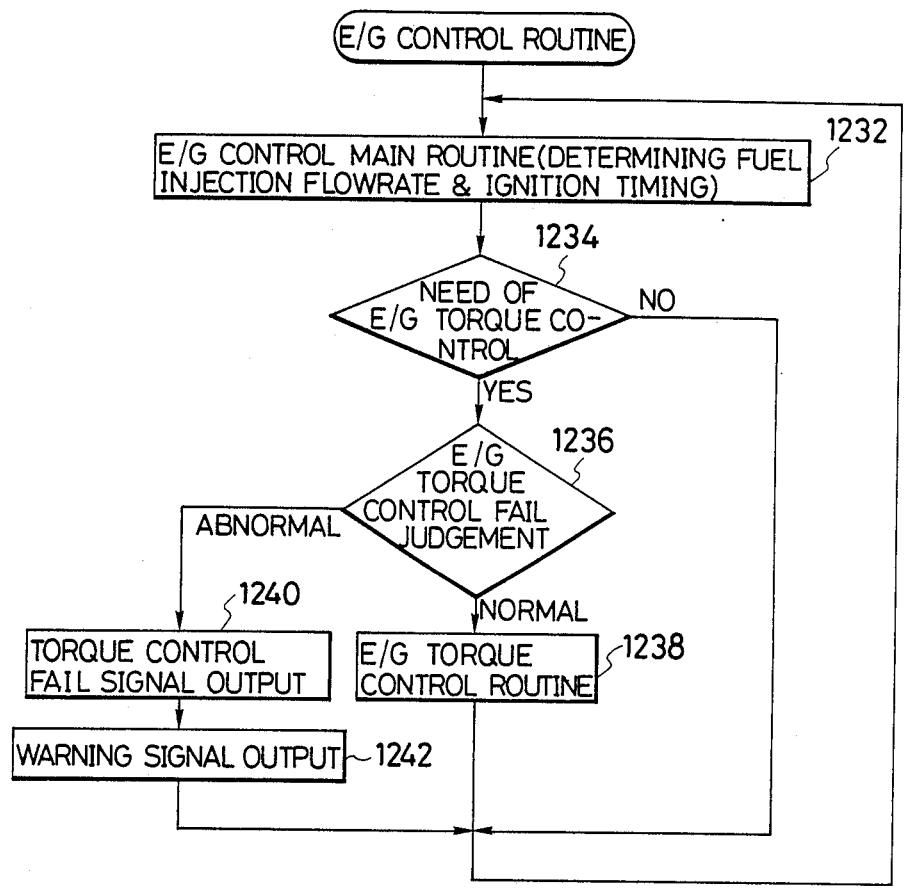
FIG. 5 is a flow chart showing the engine control routine adopted in the above-mentioned system.

FIG. 5 is the flow chart showing the engine control routine.

In the engine control routine, fuel injection flowrate and an ignition timing are determined in proportion to engine rotary speed, intake air flowrate and the like (Step 1232). Subsequently, the presence of need of engine torque control is judged (Step 1234), and, when there is no need, nothing is done. When there is need, judgment is made as to whether the engine torque control is in a state of fail (not performed) or not (Step 1236). When everything is normal, the engine torque control routine (Step 1238: the routine shown in FIG. 4) is carried out. When the engine torque control is not carried out for some reason or another, a torque control fail signal is outputted to ECT (Step 1240), and a warning signal is outputted to a warning device (Step 1242).

Figure 6:
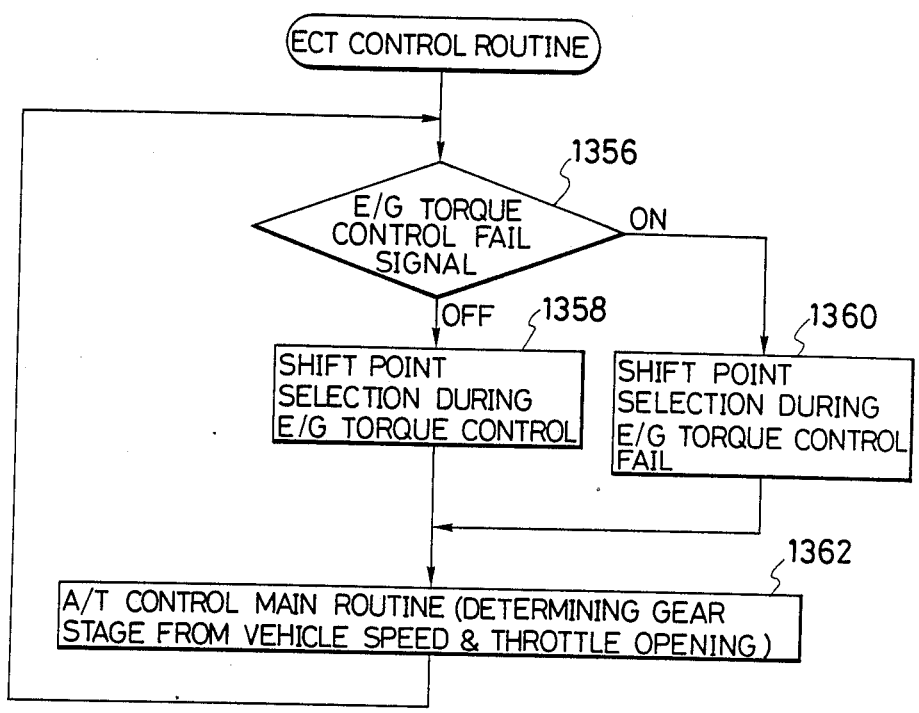
FIG. 6 is a flow chart showing the automatic transmission control routine adopted in the above-mentioned system.

FIG. 6 is the flow chart showing ECT control routine. First, the presence of the torque control fail signal is judged in Step 1356. When the fail signal is OFF, a shift point at the time when the torque control is performed (normal time) is selected (Step 1358), and, when the fail signal is ON, a shift point at the time when the torque control is not performed is selected (Step 1360). Thereafter, in the main routine of ECT, a gear stage is determined in proportion to the vehicle speed and the throttle opening, on the basis of the selected shift point (Step 1362).

Figure 7A:
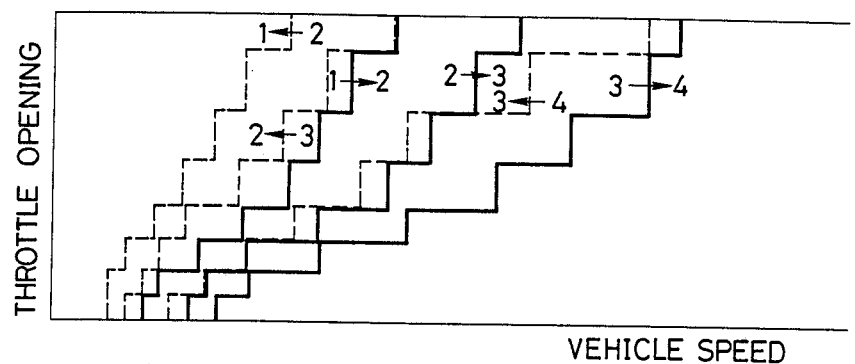
FIGS. 7(A) and 7(B) are charts showing modified examples of the shift point map adopted in the above-mentioned system.
Figure 7B:
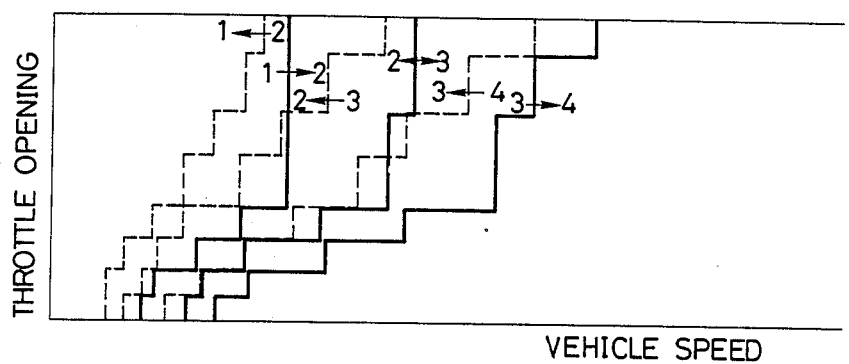

Additionally, the shift point at the time when the torque control is not carried out is set rather low as compared with the shift point at the time when the torque control is carried out as shown in FIGS. 7(A) and 7(B). When the shift point is set rather low, the heat load of the frictionally engaging devices during the shifting is decreased, so that the shift time duration can be shortened accordingly and the durability of the functionally engaging devices can be improved.

According to the above embodiment, even if the torque change control is not carried out for some reason or another, ECT selects a low set shift point in association therewith, so that the durability of the frictionally engaging devices can be secured, and worsened shift feeling due to prolonged shift time duration can be avoided.

Furthermore, the driver can be informed of an abnormality by the warning device, so that unusual feeling due to the lowered shift point can be recognized, and, when this warning is continuously issued, inspection of a trouble portion can be quickly performed.

The second embodiment of the present invention will hereunder be described in detail with reference to FIGS. 8(A) and 8(B). In the system, hard parts and components quite similar to the ones in the first embodiment can be used. This is true of all of the remaining embodiments and so forth.

Figure 8A:
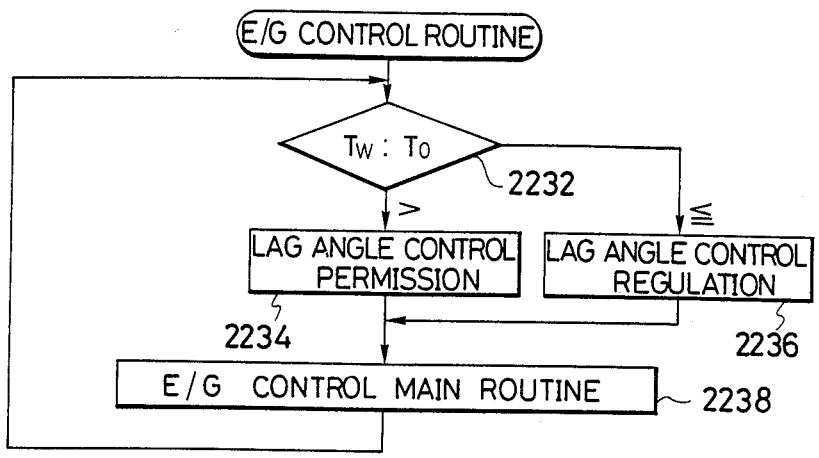
FIGS. 8(A) and 8(B) are flow charts showing control flows adopted in a second embodiment of the present invention.

FIG. 8(A) is the flow chart showing the engine control routine.

First, engine cooling water temperature Tw is compared with a predetermined value To (Step 2232), and, when Tw >To, i.e. the engine is satisfactorily warmed up, lag angle control (the engine torque change control) is permitted (Step 2234). However, Tw≦To, i.e. the engine is not warmed up, the lag control is regulated (Step 2236). Thereafter, in an engine control main routine, fuel injection flowrate and an ignition timing are determined in proportion to intake air flowrate, a throttle opening and the like (Step 2238). In this case, it should be noted that, when the lag angle control is permitted, predetermined lag angle control is carried out during shifting, and, when the lag angle control is regulated, the lag angle control is not carried out perfectly.

Figure 8B:
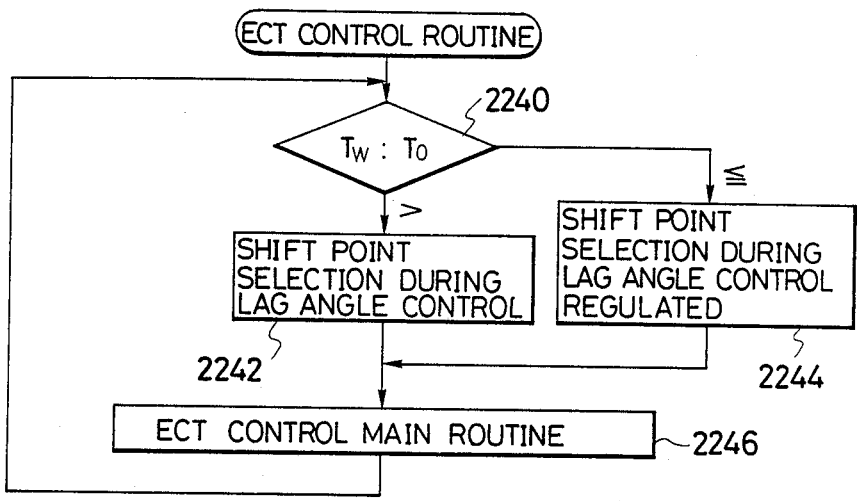

On the other hand, in the ECT control routine, as shown in FIG. 8(B), the water temperature Tw is compared with the predetermined value To (Step 2240), when Tw>To, i.e. the engine is satisfactorily warmed up, the lag angle control is carried out, and consequently, a shift point during the lag angle control is selected (Step 2242). When Tw≦To, i.e. the engine is not warmed up, the lag angle control is regulated, and consequently, such a shift point is selected as set rather low as compared with one at the time when the lag angle control is carried out. As a result, deteriorated durability of the frictionally engaging devices and worsend shift feeling can be avoided (Step 2244).

FIGS. 7(A) and 7(B) also shown the above-described state in the second embodiment. Referring to the drawings, FIG. 7(A) shows the state at the time when the lag angle control is carried out. And FIG. 7(B) the shift map at the time when the lag angle control is regulated respectively.

Figure 9A:
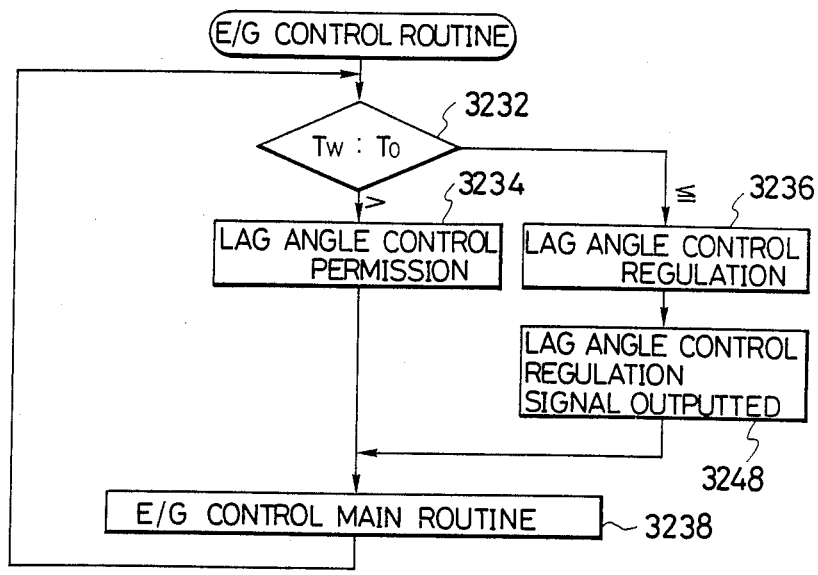
FIG. 9(A) and 9(B) are flow charts showing control flows adopted in a third embodiment of the present invention.

Thereafter, in the main routine of ECT control, a gear stage is determined in proportion to vehicle speed and throttle opening (Step 2246). It should be noted that, in this case, the gear stage is determined on the basis of the shift point selected in Step 2242 or 2244. Additionally, here, the value To shown in FIG. 8(A) and the value To shown in FIG. 8(B) are equal to each other FIG. 9 is the flow chart showing the third embodiment of the present invention. Since, in the second embodiment, comparison of Tw with To is performed in both the routines of the engine and ECT, programs of the both routines are doubled and timings of comparison are not assured to coincide with each other in the both routines, so that improvements are made in these portions. Additionally, Step members in the second embodiment are adopted as they are in the third embodiment in the same Steps, so that detailed description will not be repeated.

In the engine control routine, when Tw≦To, lag angle control is regulated (Step 3236), and a lag angle regulation signal is outputted to ECT (Step 3248). Judgment is made as to whether this signal is ON or OFF on ECT control routine (Step 3250), and selects each other shift point in response thereto (Steps 3242 and 3244). Additionally, the lag angle control regulation signal may be identical with an overdrive cancel signal. More specifically, when overdrive is regulated to secure the drivability and facilitate the warm-up during low temperature, and consequently, an overdrive cancel signal is outputted from the engine to ECT (Refer to FIG. 1 and 2), increase in number of input and output signals can be avoided through utilization of this signal.

According to the above second and third embodiments, when the engine is under low temperature, the engine torque control is regulated, so that the state where misfire and the like tend to occur can be avoided. As a result, a catalyst muffler can be prevented from being deteriorated.

Further, even if the lag angle control is regulated on the engine as described above, the shift point set lower is selected on ECT during this period of time, so that, even if the lag angle control is regulated in the shifting generated during this period of time, the durability of the frictionally engaging devices can be secured, and worsened shift feeling due to prolonged shift time duration can be avoided.

The fourth embodiment of the present invention will hereunder be described in detail with reference to FIGS. 10 and 11.

Figure 10:
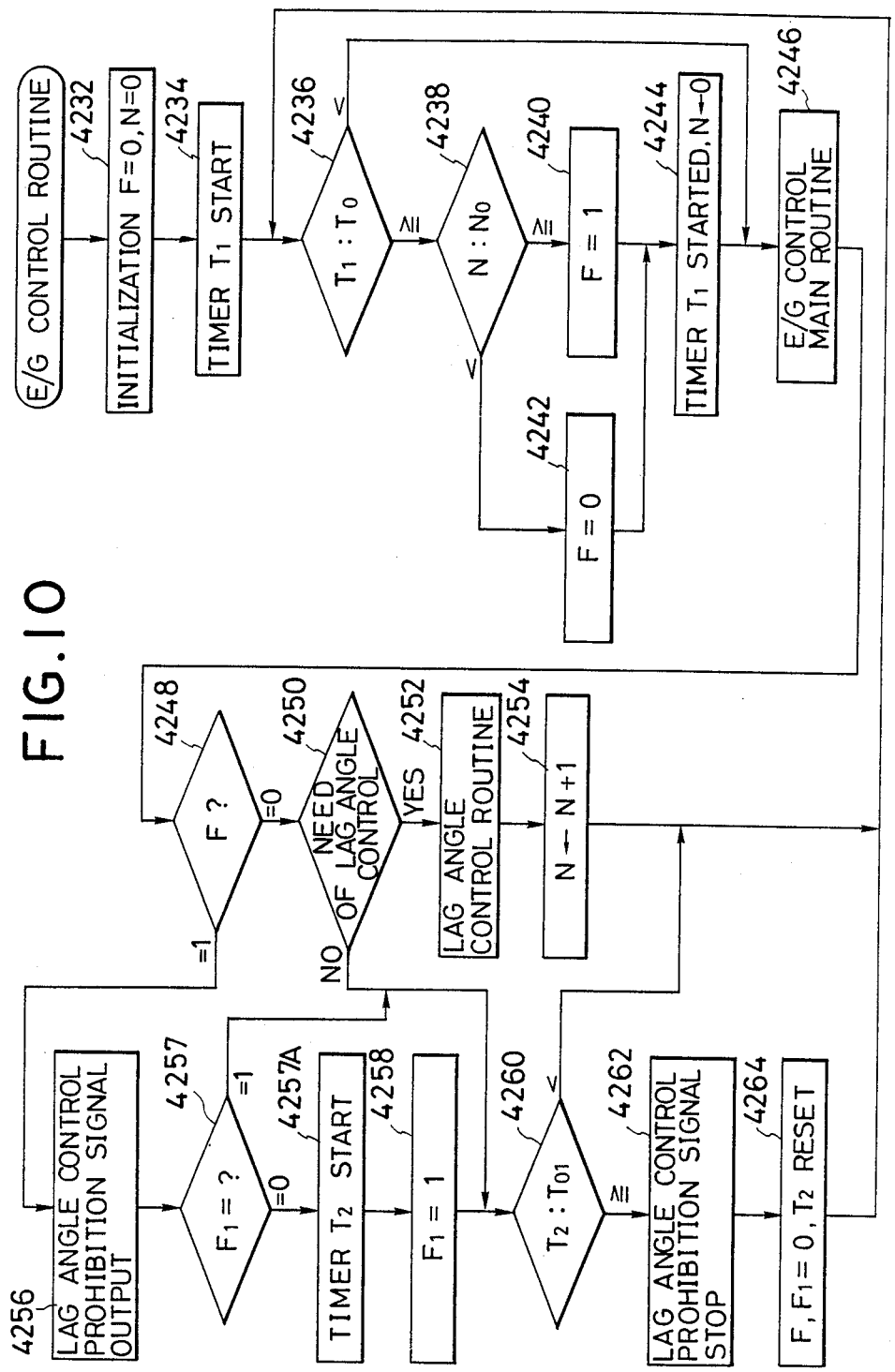
FIGS. 10 and 11 are flow charts showing control flows adopted in a fourth embodiment of the present invention.

FIG. 10 is the flow chart showing the engine control routine.

First, for the initialization, flag F and counter N are reset (Step 4232). Flag F indicates a lag angle control prohibiting time, and counter N shows a number of times of performed lag angle controls. Subsequently, a timer T1 is started (Step 4234), and a time value of the timer is compared with the predetermined period of time To (Step 4236). When the time value of the timer T1 does not reach the predetermined period of time To, the routine proceeds to Step 4246. When the time value of the timer T1 reaches the predetermined period of time To, the value of counter N is compared with a predetermined number of times No (Step 4238). When N<No, i.e. the lag angle control number is less than the predetermined number of times, flag F is set to zero (Step 4242). When N≦No, i.e. the lag angle control number reaches the predetermined number of times or more, flag F is set to one (Step 4240), thereafter, the timer T1 is restarted and counter N is reset (Step 4244). As a consequence, only when the lag angle controls are carried out the predetermined number of times No or more in the predetermined period of time To, flag F is set to one.

Step 4246 is the engine control main routine, wherein fuel injection flowrate and an ingnition timing are determined in proportion to engine rotary speed and intake air flowrate. Subsequently, flag F is judged (Step 4248), and, when flag F is one, a lag angle control prohibition signal is outputted (Step 4256). However, when F=0, i.e. the lag angle control is permitted, the presence of need of the lag angle control is judged (Step 4250). When there is no need, the routine, proceeds directly to Step 4260. When there is need, the lag angle control is carried out in accordance with a lag angle control routine (Step 4252 : the routine shown in FIG. 4), and count-up is performed (Step 4254).

When flag F=1, the lag angle control prohibition signal is outputted, and thereafter, flag F1 is judged (Step 4257). This flag F1 judges whether the lag angle control regulation is performed first or not. When the lag angle control regulation is performed first, it is judged F1=0. Consequently, the routine proceeds to Step 4257A, where a timer T2 is started, and flag F1 is set to one in Step 4258. Then, the time value of the timer T2 is compared with a predetermined period of time To1 (Step 4260), and, when T2<To1, nothing is done. When T2≧To1, i.e. the predetermined period of time To1 has elapsed after the lag angle control is prohibited, the lag angle control prohibition signal is stopped (Step 4262), and the flags F, F1 and the timer T2 is reset (Step 4264).

Figure 11:
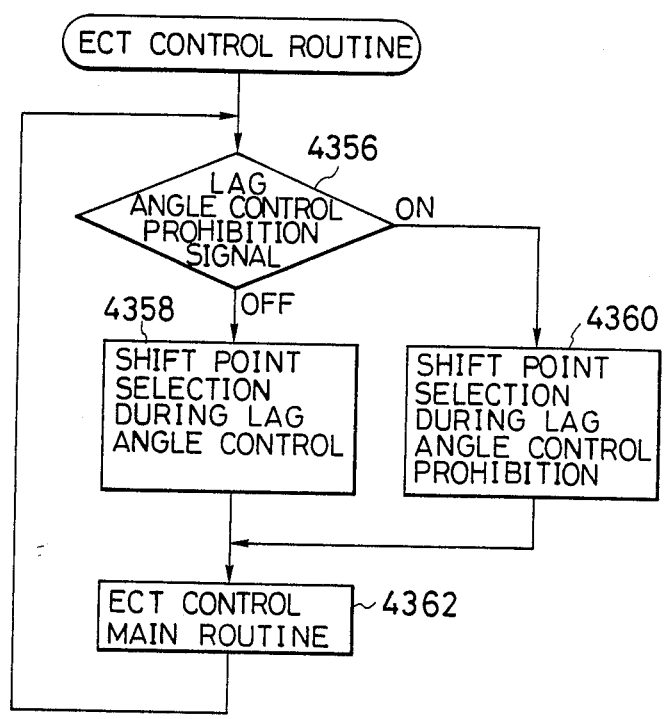

FIG. 11 is the flow chart showing the ECT control routine. First, the presence of the lag angle control prohibition signal is judged in Step 4356, and, when the prohibition signal is OFF, a shift point during the lag angle control (normal time) is selected (Step 4358). When the prohibition signal is ON, a shift point during the lag angle control prohibition is selected (Step 4360). Thereafter, in the ECT control main routine, a gear stage is determined in proportion to a vehicle speed and a throttle opening on the basis of the selected point (Step 4362).

Additionally, the shift point during the lag angle control prohibition is set lower as compared with the shift point while the lag angle control is carried out as shown in FIGS. 7(A) and 7(B). When the shift point is set lower, the heat load of the frictionally engaging devices during shifting is decreased, so that the shift time duration can be shortened and the durability of the frictionally engaging devices can be improved, accordingly.

According to the fourth embodiment, when the engine torque controls (lag angle controls) of the predetermined number of times No are carried out in the predetermined period of time To, the subsequent lag angle control is prohibited for the predetermined period of time To1, so that rise in temperature of an exhaust pipe, a catalyst converter and the like due to increased afterburn can be held within a threshold limit value and the durability of these members can be secured.

Further, even if the lag angle control is prohibited on the engine as described above, the shift point set lower is selected on ECT during this period of time, so that, even if the lag angle control is prohibited in the shifting generated during this period of time, the durability of the frictionally engagning devices can be secured, and worsened shift feeling due to prolonged shift time duration can be avoided.

Additionally, in the fourth embodiment, when the lag angle controls of the number of times No are carried out in the predetermined period of time To, the lag time control has been completely stopped for the predetermined period of time To1, however, according to the present invention, the lag angle control is not necessarily completely stopped, and such measures are effective that the torque change value is decreased, the period of time for performing the torque change is shortened, or performing of the torque change control is restricted to the period of time during which the throttle opening is high, or restricted to specific type of shifting, for example. In these cases, when it is judged that the value of the timer T2 is smaller than the predetermined period To1 in Step 4260 shown in FIG. 10, a routine similar to the lag angle control routine shown in FIG. 4 may be carried out with a data condition thereof being changed.

In general, as the cases where the torque change is carried out, whereby temperature of an exhaust system rises, there are a case where the ignition timing is delayed to decrease the engine torque and a case where the fuel injection flowrate is increased to increase the engine torque for example. When such a measure is taken that the fuel injection flowrate and the intake air flowrate are decreased to reduce the engine torque during shifting, misfire or deteriorated exhaust gas ingredients due to continuous decrease in the fuel injection flowrate and the like can be avoided.

The fifth embodiment of the present invention will hereunder be described in detail with reference to FIG. 12.

Figure 12:
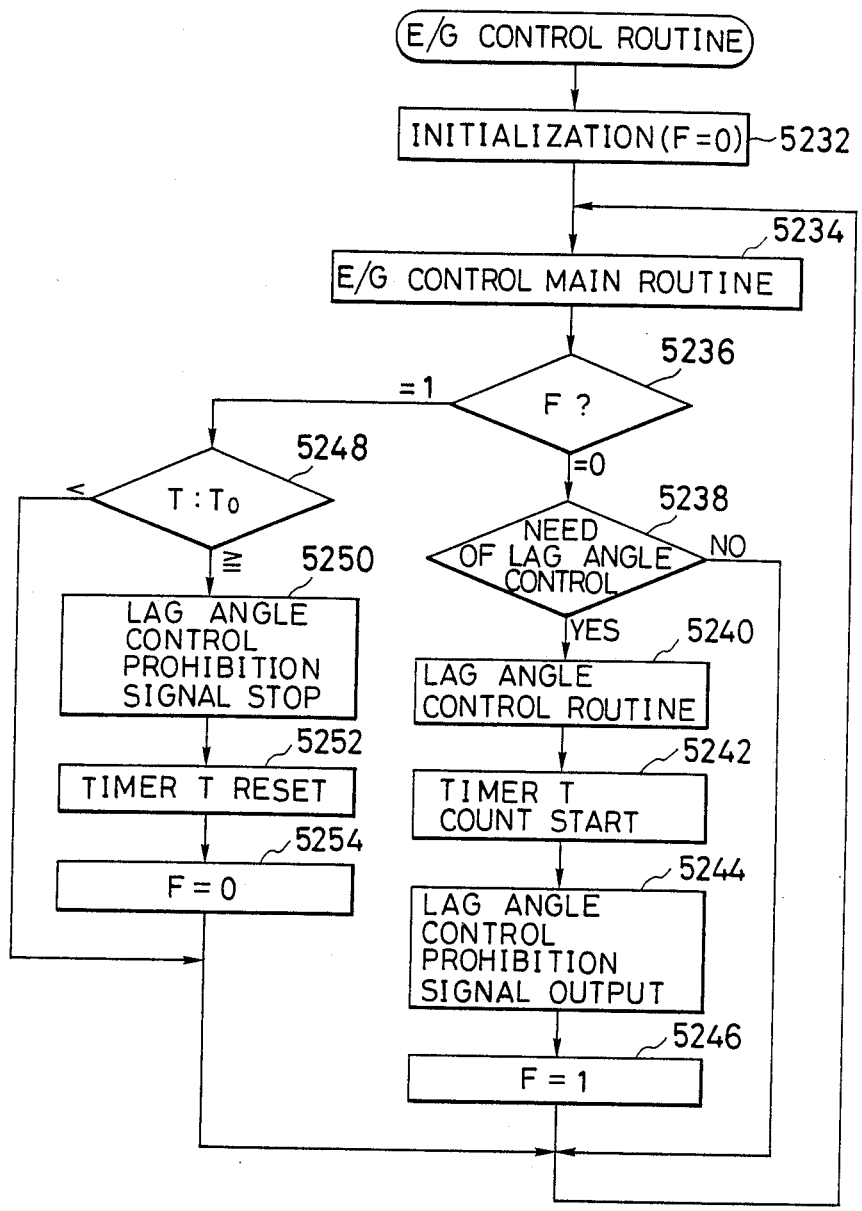
FIG. 12 is a flow chart showing a control flow adopted in a fifth embodiment of the present invention.

FIG. 12 is the flow chart showing the engine control routine.

First, for the initialization, flag F is reset (Step 5232). This flag indicates a state where the lag angle control is prohibited. In the engine control main routine, fuel injection flowrate and an ignition timing are determined in proportion to engine rotary speed, intake air flowrate and the like (Step 5234). Subsequently, flag F is judged (Step 5236), and, when F=0, i.e. the lag angle control is not prohibited, the presence of need of a lag angle control is judged (Step 5238). When there is no need for the lag angle control, nothing is done. However, when it is judged that there is need of the lag angle control, a predetermined lag angle control as shown in FIG. 4 is carried out in a lag angle control routine (Step 5240). After the lag angle control is carried out, count of the timer T is started (Step 5242), and a lag angle control prohibition signal is outputted to the ECT, further flag F is set to one (Step 5244 and 5246). When flag F is set to one, it is judged that F=1 in Step 5236, whereby the routine proceeds to Step 5248. The time in timer T is compared with the predetermined period of time To in Step 5248. When T<To, i.e. the predetermined period of time To has not elapsed after the lag angle control, nothing is done. When T≧To, i.e. the predetermined period of time To has elapsed, the lag angle control prohibition signal is stopped (Step 5250), the timer T is reset, and thereafter, flag F is reset (Step 5252 and 5254). As a consequence, in the engine control routine, until the predetermined period of time To has elapsed after performing of the lag angle control, the lag angle control is not carried out and a lag angle control prohibition signal is outputted to the ECT.

In the ECT control routine, after receiving the lag angle control prohibition signal, the same control as shown in FIG. 11 in the preceding forth embodiment is carried out.

According to the fifth embodiment as described above, since continuous two or more lag angle controls are prohibited on the engine side in the predetermined period of time, temperature rise in the exhaust pipe, the catalyst converter and the like can be held within the threshold limit value, so that the durability of the above-mentioned members can be secured.

Further, even if the lag angle control is prohibited on the engine as described above, the shift point set lower is selected on ECT during this period of time, so that, even if the lag angle control is prohibited in the shifting generated during this period of time, the durability of the frictionally engagning devices can be secured, and worsened shift feeling due to prolonged shift time duration can be avoided.

In the above embodiment, continuous two or more torque change controls are about to be carried out in the predetermined period of time, the torque change control of the second time has been completely stopped, however, the complete stop is not necessarily required, and, instead, for example, the torque change value may be decreased, the period of time for performing the torque change may be shortened, or performing of the torque change control may be restricted to the period of time during which the throttle opening is high, or restricted to specific type of shifting. In these cases, a lag angle control regulation signal is outputted in Step 5244 in FIG. 12, and, when it is judged that the time value of the timer T is smaller than the predetermined period of time To in Step 5248 shown in FIG. 12, a routine similar to the lag angle control routine shown in FIG. 4 may be carried out with a data condition thereof being changed.

The sixth embodiment of the present invention will hereunder be described in detail with reference to FIG. 13.

Figure 13:
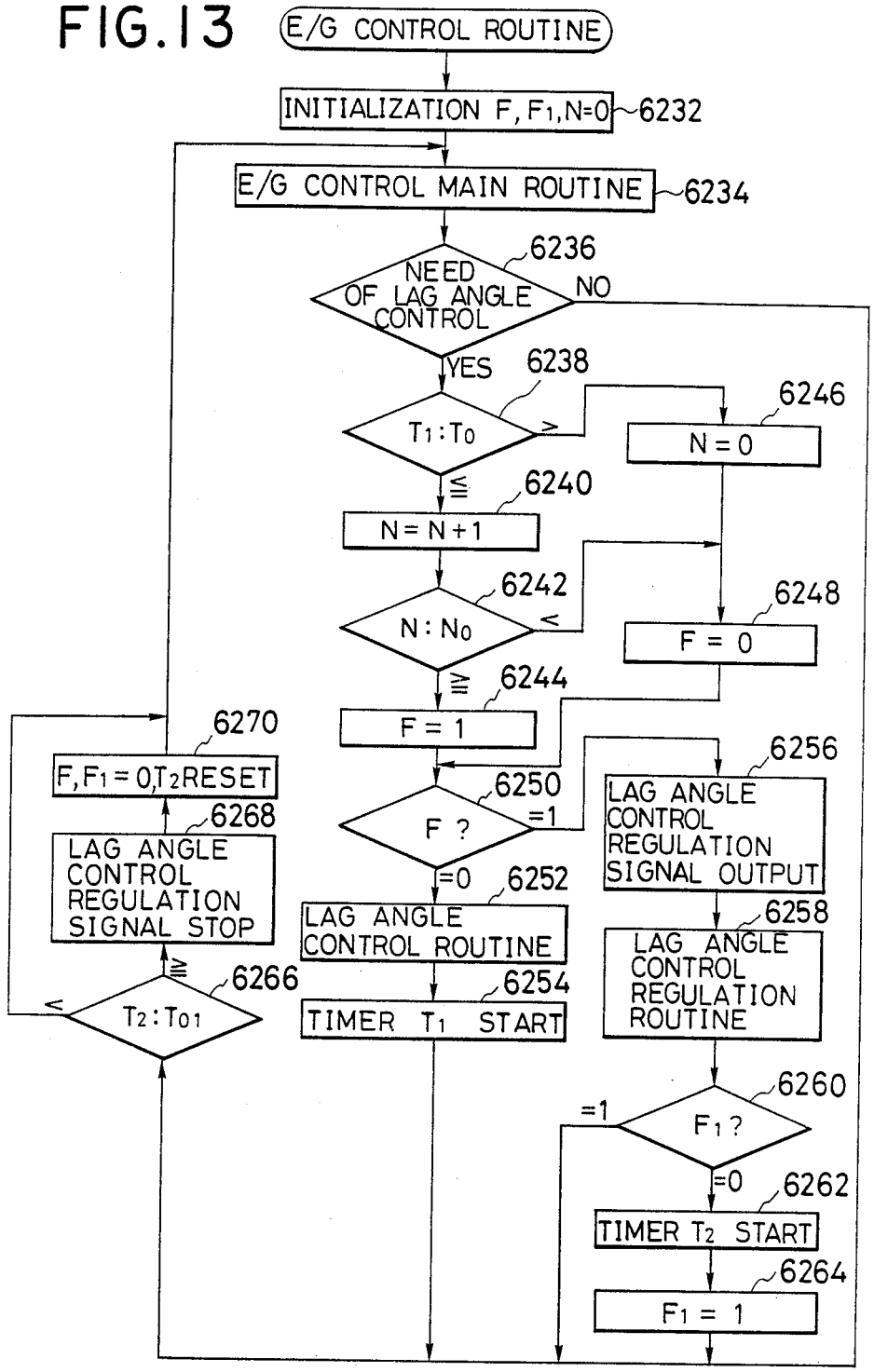
FIG. 13 is a flow chart showing a control flow adopted in a sixth embodiment of the present invention.

FIG. 13 is the flow chart showing the engine control routine.

First, for the initialization, the flags F, F1 and counter N are reset (Step 6232). Flag F indicates the time of the lag angle control prohibition, flag F1 indicates that the period of time for the lag angle control prohibition is being counted, and counter N indicates the number of times of the performed by lag angle controls.

Subsequently, in the engine control main routine, a fuel injection flowrate and an ignition timing are determined (Step 6234). Then, the presence of need of the lag angle control is judged (Step 6236), and, when there is no need, nothing is done, and the routine proceeds to Step 6266. When there is need, the time value of the timer T1 (This timer indicates an elaped time after performing of the lag angle control) is compared with the predetermined period of time To (Step 6238), and, when T1>To, counter N is reset (Step 6246), and flag F is reset (Step 6248). However, when T1≦To, i.e. need of a lag angle control occurs in the predetermined period of time To, counter N is incremented (Step 6240), and subsequently, the counter value is compared with the predetermined number time No (Step 6242). When N<No, flag F is reset (Step 6248). However, when N≧No, i.e. continuous lag angle control of the number of times No or more occur in the predetermined period time To, flag F is set to one (Step 6244). In Step 6250, flag F is judged. When F=0, i.e. in the normal case, the lag angle control is carried out in accordance with a lag angle control routine (FIG. 4) (Step 6252), and the timer T1 is started (Step 6254). When F=1, i.e. continuous lag angle controls of the number of times No or more occur in the predetermined period of time, a lag angle control regulation signal is outputted (Step 6256), subsequently, the lag angle control is regulated in accordance with a lag angle control regulation routine (Step 6258), and Flag F1 is judged (Step 6260). flag F1 judges whether the lag angle control is carried out first or not. When the lag angle control is carried out first, it is judged that F1=0, consequently, the routine proceeds to Step 6262, where the timer T2 is started, and F1 is set to one in Step 6264. Additionally, as for the control when the engine torque control is regulated, such measures may be thought of that, for example, the torque change value is decreased, the period of time for performing the torque change is shortened, performing of the torque change control is shortened, and performing of the torque change control is restricted to the period of time during which the throttle opening is high or restricted to specific type of shifting. In these cases, a routine similar to the lag angle control routine shown in FIG. 4 may be carried out with a data condition thereof being changed in Step 6258. Additionally, needless to say, it is possible to stop the control completely (Step 6258 is cut).

After the lag angle control is carried out, the value of the timer T2 is compared with the predetermined period of time To1 (Step 6266), and, when T2<To1, nothing is done. When T2<To1, i.e. after the predetermined period of time To1 elapsed from the regulation of the lag angle control, the lag angle control regulation signal is stopped (Step 6268), and the flags F, F1 and the timer T2 are reset (Step 6270).

Figure 9B:
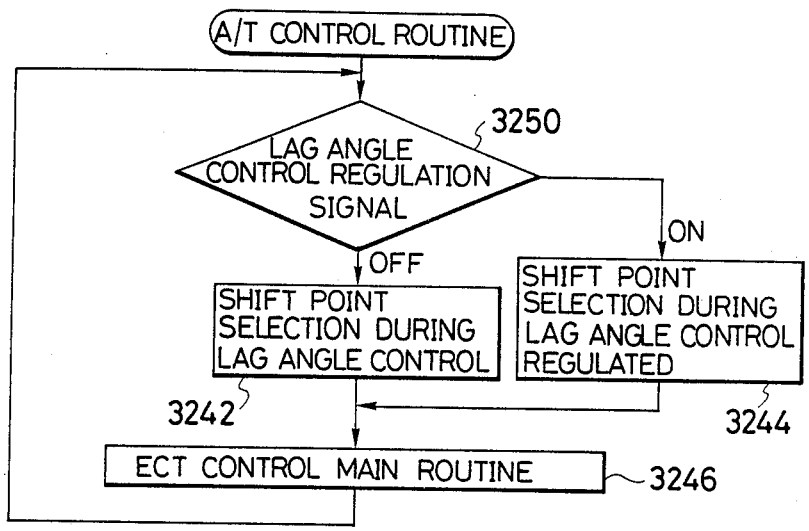

In the ECT control routine, a routine quite similar to the flow in the preceding third embodiment as shown in FIG. 9(B) is carried out.

According to the above sixth embodiment, when the engine torque changes each having a time interval shorter than the predetermined period of time To are continuously carried out the predetermined number of times (No), the subsequent lag angle control is regulated for the predetermined period of time To1, so that temperature rise in the exhaust pipe, the catalyst converter and the like due to increased afterburn can be held within the threshold limit value and the durability of the above-mentioned members can be secured.

Further, even if the lag angle control is regulated on the engine as described above, the shift point set lower is selected on ECT during this period of time, so that, even if the lag angle control is regulated in the shifting generated during this period of time, the durability of the frictionally engagning devices can be secured, and worsened shift feeling due to prolonged shift time duration can be avoided.

Figure 14:
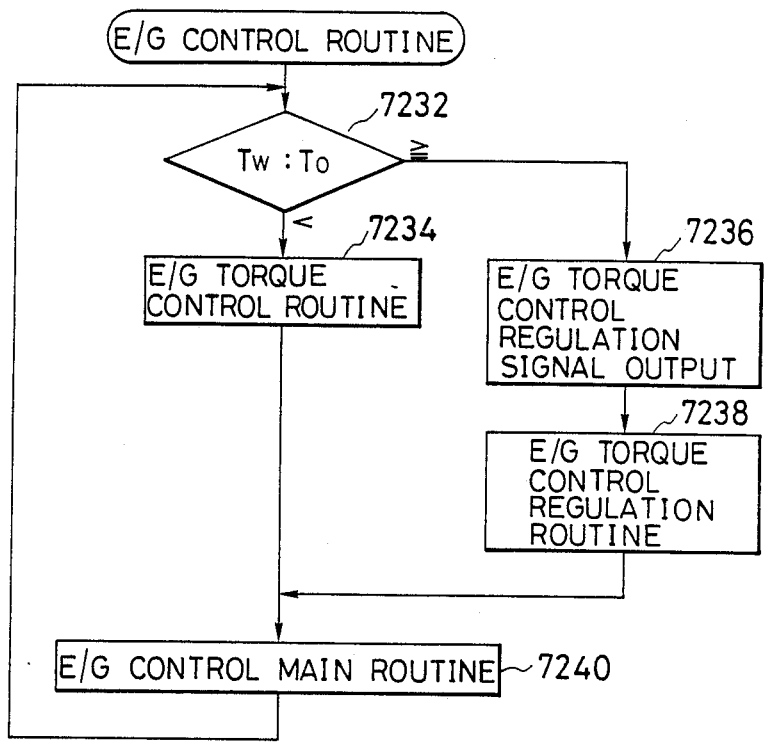
FIG. 14 is a flow chart showing a control flow adopted in a seventh embodiment of the present invention.

FIG. 14 is the flow chart of the engine control routine showing the seventh embodiment of the present invention.

First, the engine water temperature Tw is compared with the predetermined value To (Step 7232). When Tw<To, i.e. there is neither overheat nor possibility of overheat, the engine torque control is carried out in accordance with the engine torque control routine (Step 7234). On the other hand, when Tw≧To, i.e. when there is overheat or a possibility of overheat, an engine torque control regulation signal is outputted (Step 7236), and subsequently, the engine torque control is regulated in the engine torque control regulation routine (Step 7238). Now, as the method of regulating the engine torque control, such a measure is thought of that the control value is changed and so on, in addition to the prohibition of the engine torque control. More, specifically, in the case of the lag angle control, there are measures of the lag angle value change, the lag angle time duration change, the change in throttle opening for performing the lag angle control and the like. In the case of the fuel injection flowrate control, there are measures of the fuel injection flowrate cut value change, the cut time duration change, the change in throttle opening for performing the cut and the like. Subsequently, in the engine control main routine, fuel injection flowrate and an ignition timing are determined (Step 7240).

In the ECT control routine, a control quite similar to the flow of the preceding third embodiment as shown in FIG. 9(B) is carried out.

According to the above embodiment, even if the engine falls into a state of overheat or a state close to overheat, the engine torque control accompanied by further temperature rise is regulated, so that such disadvantages that the temperature around the engine, particularly the temperature of the exhaust system is further raised can be avoided.

Further, even if the lag angle control is regulated on the engine as described above, the shift point set lower is selected on ECT during this period of time, so that, even if the lag angle control is regulated in the shifting generated during this period of time, the durability of the frictionally engaging devices can be secured, and worsened shift feeling due to prolonged shift time duration can be avoided.

The eighth embodiment, to which is applied the present invention in association of a trouble in the sensor system, will hereunder be described.

Figure 15:
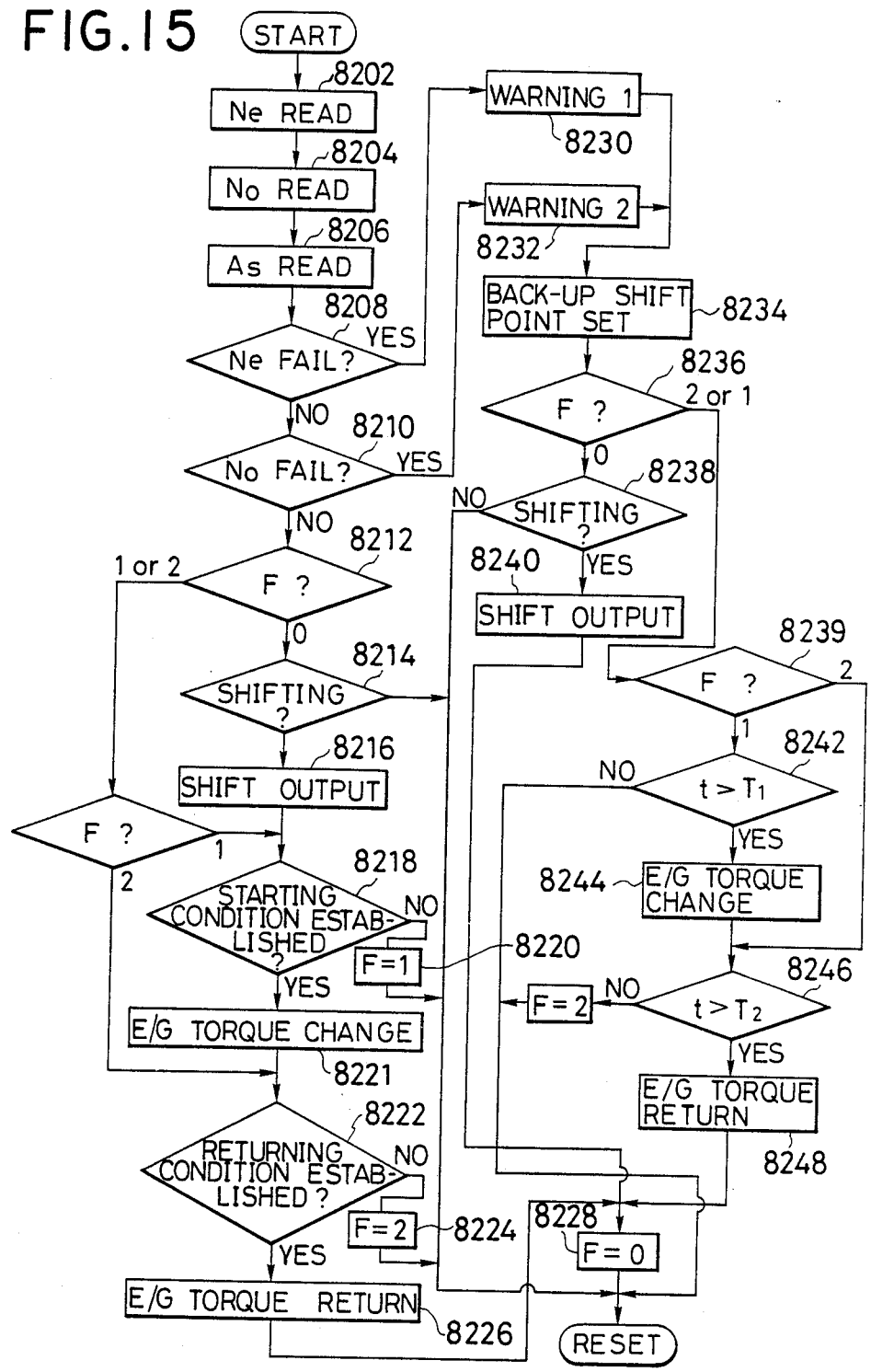
FIG. 15 is a flow chart showing a control flow adopted in a eighth embodiment of the present invention.

The engine torque control for the vehicle in the eighth embodiment is carried out in accordance with the flow chart shown in FIG. 15. Additionally, in the eighth embodiment, functions of the engine control computer 40 and the ECT control computer 50 are integrally shown.

First, in Steps 8202 - 8206, engine rotary speed signal Ne obtained from a crank angle sensor 108, vehicle speed signal obtained from a vehicle speed sensor 110 (to be specifically, the rotary speed signal No of the ECT output shaft) and throttle opening signal As obtained from a throttle sensor 102 are read in. Subsequently, the presence of a trouble in the sensor system of the engine rotary speed Ne is determined in Step 8208. When there is no trouble, the routine proceeds to Step 8210, where the presence of a trouble in the sensor system of the output shaft rotary speed No is determined. If the state is normal, the routine proceeds to Step 8212, where flag F is checked. This flag F is the one for controlling the flow. Since flag F is initially set to zero, the routine proceeds to Step 8214, where judgment is made whether there is the shifting. If the shifting does not occur, flag F is reset. However, when a shift judgment is made, shift output (output to the electromagnetic valves S1 - S4) is made in Step 8216.

In Step 8218, whether a condition for starting the torque change is established or not is determined depending on whether the condition that the current engine rotary speed Nei becomes smaller in value than the preceding engine rotary speed Nei−1, are continuously established a number of times n or not, for example. Until a starting condition is established, flag F is set to one, and thereafter, reset in Step 8220. When a starting condition is established, the torque change is started in Step 8221, and the change is maintained until a returning condition is established in Step 8222. This returning condition is determined depending on whether the engine rotary speed Ne becomes smaller in value than a value obtained by multiplying the output rotary speed No by a gear ratio ih and then added thereto with a constant N1 (Ne<No×ih+N1) or not, for example. Here, ih is the gear ratio on the side of high gear, and N1 is the constant determined in association with the type of shifting, the engine load, the vehicle speed, the select position of the pattern select switch or the like. Until this returning condition is established, flag F is set to two in Step 8224. When the returning condition is established, the engine torque is slowly returned in Step 8226, and flag F is set to zero in Step 8228.

On the other hand, in either Step 8208 or 8210, when the judgment is affirmative, i.e. the judgment of the presence of a trouble in either the sensor system of the engine rotary speed Ne or the sensor system of the output shaft rotary speed No, a warning 1 or a warning 2 is issued in Step 8230 or 8232, respectively, and a shift point changed to a lower one for back-up is set in Step 8234. The shift point in this case and the shift point during the normal time when the torque down control is carried out nomally are compared with each other, and are also shown in FIGS. 7(A) and 7(B). After the shift point for back-up is set, flag F is checked in Step 8236, and, when F=0, shift judgment is made in Step 8238. When there is a shift judgment, a shift output is outputted in Step 8240. In this case, the engine torque change control is not carried out, in particular. When it is judged that flag F is set at one, in Step 8236 and 8239, both establishing conditions including a condition for starting the torque change and a condition for returning are judged by the times T1 and T2, and in Steps 8242–8248, the torque change control is carried out.

When flag F is set to two, only the returning condition is detected by the timer T2, and the torque return of the engine is carried out by the detection.

More specifically, after the shift output in Step 8216 or after the start of the engine torque change in Step 8220, when the engine rotary speed Ne or the output shaft rotary speed No is fallen into a trouble, the torque control is carried out for the shifting by the timer.

In the above embodiment, if a trouble occurs in the sensor system for determining a timing of the engine torque change, then the torque change is stopped and the shift point on the ECT side is changed to a rather low one, so that the durability of the frictionally engaging devices can be secured even if the engine torque control is not performed. The types of warning are varied depending on either when the engine rotary speed Ne is in trouble or when the output shaft rotary speed No is in trouble, so that the driver can grasp the content of the trouble precisely.

Further, the form of the torque down control is changed depending on when the sensor system has been fallen into trouble, the engine torque change is carried out as much as possible, and, determination of a timing for the engine torque change by the sensor system is considered to be given priority as much as possible until a trouble occurs, so that the engine torque control can be most effectively carried out.

Additionally, according to the present invention, the means itself for judging a trouble in the sensor system is not necessarily limited. As the means for judging the presence of a trouble in the sensor system, e.g. for the engine rotary speed Ne, it is judged as the trouble that no pulse for determining the engine rotary speed Ne is outputted within a predetermined period of time. This is because, differing from the ECT output shaft rotary speed No, the engine rotary speed Ne cannot be set at zero as far as the engine is operated. Furthermore, for the trouble in the ECT output shaft rotary speed No, a pair of sensor systems are provided, for example, if one of the pair of systems does not produce a predetermined number of pulses per pulse produced from the other, then a trouble in said one of the pair of systems can be detected. Further, when there are provided the pair of sensor systems, the presence of a trouble can be judged from the fact that whether outputs from the pair of the sensor systems are included within a predetermined range of error or not. Furthermore, the presence of a trouble can be judged from the fact that whether the condition for starting the torque change in Step 8218 as described above is established within a certain period of time after a predetermined period of time upon the issuance of a shift command, or not.

Furthermore, according to the present invention, the types of sensor systems for determining a timing for the torque exchange are not necessarily limited. More specifically, as the means for determining a timing for the torque change, there are various means such as means for detecting the rising conditions of the fed oil pressure or means for detecting a change in position of a piston of the accumulator in the hydraulic control device in the ECT, in addition to the means for detecting a change in the engine rotary speed and the means for detecting a change in the rotary speed of the rotary member in the ECT as in the above embodiment. However, the present invention is applicable to all of the above described means.

The ninth embodiment, where the present invention is applied in association with troubles in the sensor systems, will hereunder be described. In this ninth embodiment, as vehicle speed sensors, there are provided a first vehicle speed sensor 110A and a second vehicle speed sensor 110B.

Figure 16:
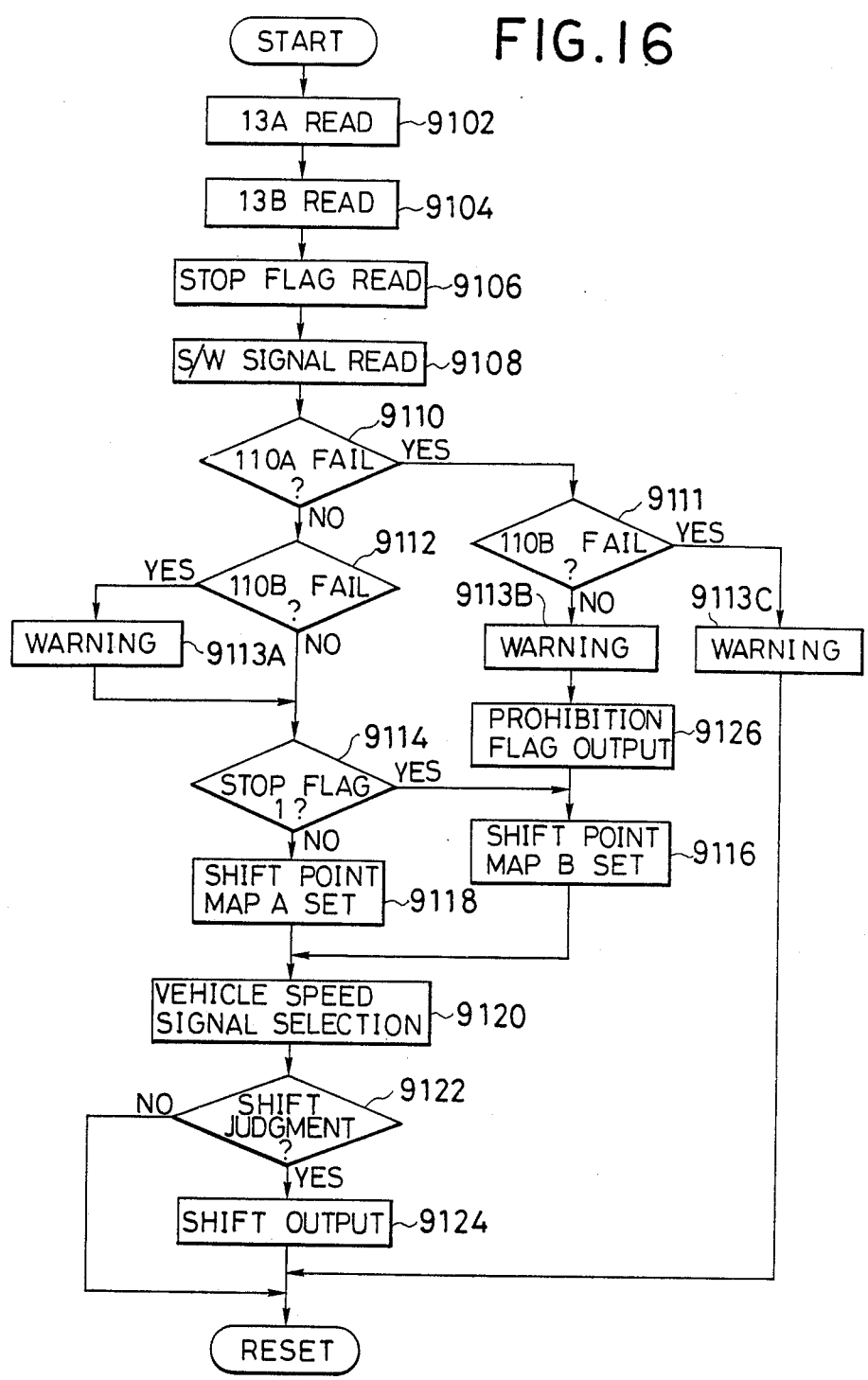
FIGS. 16 and 17 are flow charts showing control flows adopted in a ninth embodiment of the present invention.

FIG. 16 shows the control routine of ECT computer 50 in this ninth embodiment.

First, in Steps 9102-9108, there are inputted signals from the first vehicle speed sensor 110A, a signal from the second vehicle speed sensor 110B, a stop flag signal to be described hereunder from the engine control computer 40, and various switch input signals from a pattern select switch and a shift lever position signal etc.

In Step 9110, fail judgment of the first vehicle speed sonsor 110A is carried out. Additionally, for this fail judgment, such well known means can be used as means for performing a parity check or means for detecting whether there is no pulse input in a predetermined period of time or not, for example. When there is no fail, the routine proceeds to Step 9112, where fail judgment of the second vehicle speed sensor 110B is made. When there is no fail, judgment is made as to whether a stop flag read in Step 9106 is set at one or not. When the stop flag is set at one, this means that the engine control computer 40 has stopped the torque change control for some reason or another. Consequently, the routine proceeds to Step 9116, where a shift point map B (a rather low shift point map: reference is also to be made to FIG. 7B) is set, and thereafter, the routine proceeds to Step 9120, where selection of vehicle speed signal is made. On the other hand, when the stop flag does not stand, this means that the engine torque change is carried out according to a schedule. Consequently, a shift point map A (a normal shift point map: reference is also to be made to FIG. 7A) is set, and thereafter, the routine proceeds to Step 9120, where selection of vehicle speed signal is made. As for this selection of the vehicle speed signal, when both the first and the second vehicle speed sensors 110A and 110B do not fail or only the first vehicle speed sensor 110A does not fail, vehicle speed from the first vehicle speed sensor 110A is selected, and, when only the second vehicle speed sensor 110B does not fail, vehicle speed from the second vehicle speed sensor 110B is selected, respectively.

In Steps 9122 and 9124, shift judgment is performed in accordance with the shift point map A or B thus selected and in response to the vehicle speed signal (and throttle opening). When a shifting is needed, the shift output is made.

Additionally, when it is judged that only the first vehicle speed sensor 110A is normal in Steps 9110 and 9111, an engine torque control prohibition flag is outputted in Step 9126. Furthermore, when both vehicle speed sensor 110A and 110B fail, warning to the effect that the both vehicle speed sensor fail is issued in Step 9113A-9113C.

Figure 17:
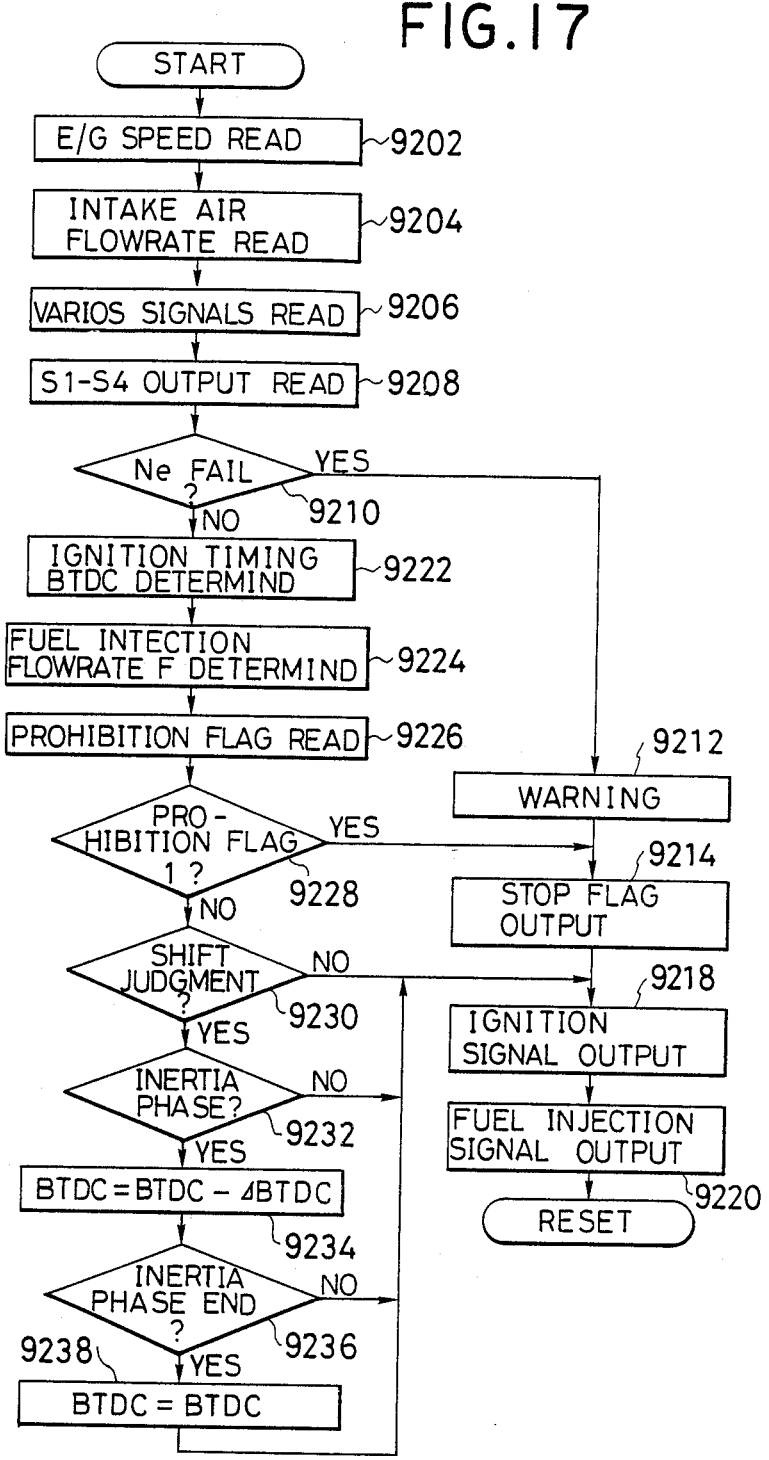

FIG. 17 shows the control routine in the engine control computer 40.

First, in Steps 9202-9208, various input signals of the engine rotary speed, intake air temperature, engine cooling water temperature, etc, and outputs from the electromagnetic valves S1 - S4 of the ECT are read in. In Step 9210, judgment is made as to whether the sensor system of the engine rotary speed Ne fails or not by use of a well known method. When it is judged that the sensor system fails, a warning is issued in Step 9212, a stop flag signal is outputted in Step 9214, therafrer, an ignition signal is outputted in Step 9218, and a fuel injection signal is outputted in Step 9220. However, in this case, the engine rotary speed Ne is in a state of failure, and consequently, a fixed spark advance and a fixed injection value are adopted. To be strict, these outputs are not necessarily performed in the step 9218 and 9220 of this flow chart. However, since this is not inclueded in the technique of the invention here, expression is made for making the outputs at a suitable time in step 9218 and 9220.

On the other hand, when it is judged that the sensor system of the engine rotary speed Ne is normal in Step 9210, ignition timing BTDC and fuel injection flowrate F are calculated and determined in association with the engine rotary speed Ne, an intake air flowrate per turn of the engine Q/N, etc. in Steps 9222 and 9224. Furthermore, in Step 9228, judgment is made as to whether the engine torque control prohibition flag is outputted from the ECT control computer 50 or not. When the prohibition flag stands, Steps 9214, 9218 and 9220 are followed. In this case, outputs in Steps 9218 and 9220 not fixed, but the ignition timing BTDC and the fuel injection flowrate F which are calculated and determined in Steps 9222 and 9224 are adopted.

On the other hand, when it is judged that the prohibition flag does not stand in Step 9228, in Step 9230, the presence of a shifting, the type of the shifting and the like are determined in response to the input signals from the electromagnetic valves S1-S4, which were read in Step 9208. When there is no shifting, the routine proceeds to Steps 9218 and 9220. However, when there is a shift judgment, the process enters the torque change control of Step 9232 and forth. Here, for the sake of simplification, a routine, wherein a power-on upshift judgment is carried out, is shown as a typified one. More specifically, in Step 9232, judgment is made as to whether the ECT has entered an inertia phase (a priod of time, during which the rotary member of the ECT makes a change in rotary speed for shifting) or not. When ECT has not entered, the routine proceeds to Step 9218. At a stage, where the ECT enters the inertia phase, the routine proceeds to Step 9234, and the ignition timing determined in Step 9222 is moved to the lag angle side by a predetermined value$\Delta$BTDC. The predetermined value$\Delta$BTDC is preset in accordance with the type of shifting, the throttle opening and the like. It is the well known fact that the ignition timing is moved more to the lag angle side, whereby the engine torque is decreased. The lag angle control is continued until completion of the inertia phase is detected in Step 9236, and, at a stage, where the inertia phase is completed, in Step 9238, the ignition timing BTDC determined in Step 9222 is used again.

Additionally, the inertia phase can be detected by a change in the engine rotary speed Ne, a change in rotary speed of a specific rotary member in the ECT, a change in the fed oil pressure, a change in position of the accumulator piston or the like.

Furthermore, as for the fail judgment of the first and the second vehicle speed sensors 110A and 110B, such a judgment may be made that, for example, four pulses of the first vehicle speed sensor 110A are not inputted per pulse of the second vehicle speed sensor 110B.

According to the above embodiment, when only the first vehicle speed sensor 110A fails, a signal to the effect that the engine torque control is prohibited is outputted from the ECT control computer 50, whereby the torque change control is not carried out, however, a shifting is performed in accordance with the shift point map B, wherein the shift point is set rather low.

On the other hand, when the sensor system of the engine rotary speed Ne fails, a signal to the effect that the engine torque control is stopped is outputted to the ECT control computer 50. Upon receiving this signal, the ECT performs a shift in accordance with the shift point map B, in which the shift point is set rather low, so that the durability of the frictionally engaging devices can be secured.

Figure 18:
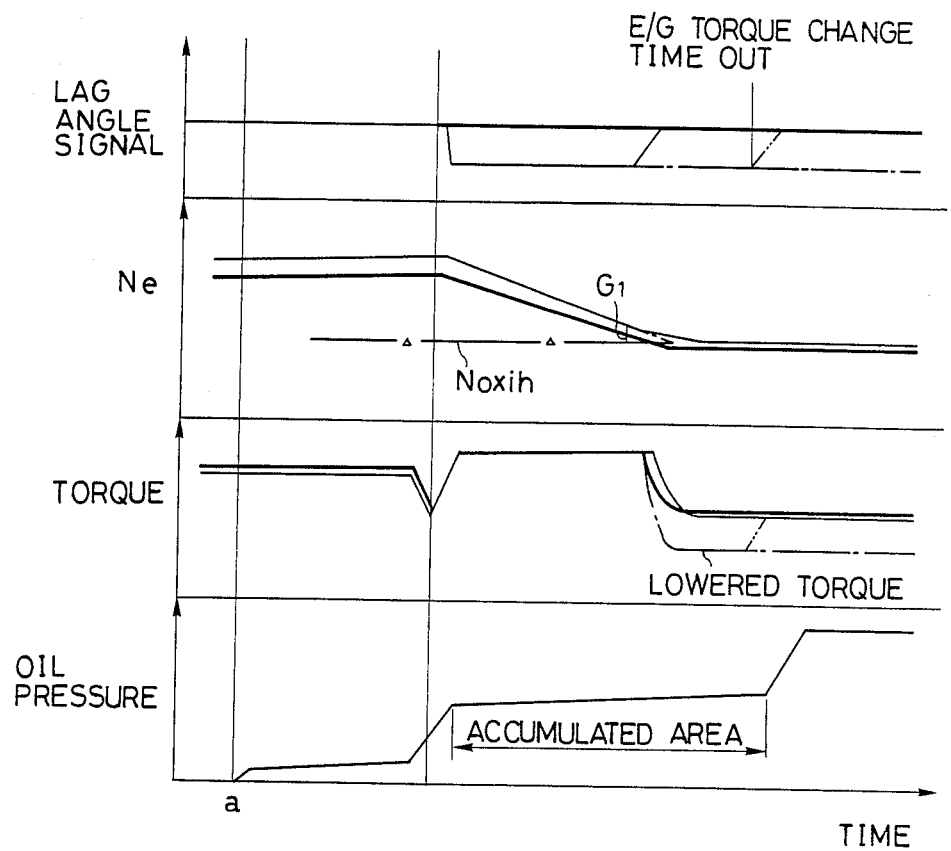
FIG. 18 is a shift transition characteristics chart showing the effects in the ninth embodiment.

FIG. 18 shows the shift transition characteristics chart qualitatively explaining the effects achieved by the above embodiment. Here, explanation is made on the assumption that the inertia phase is detected depending on whether or not the condition that the current engine rotary speed Nei is smaller in value than the preceding engine rotary speed Nei−1 is continued the number of times n, and the returning timing of the torque change is detected depending on whether or not Ne<No×ih+G1. Here, No is the vehicle speed detected by the first vehicle speed sensor 110A, ih is the gear ratio on the high gear side, and G1 is a constant.

Now, when the vehicle speed No fails, if no failsafe measure is taken, then the start of the inertia phase, i.e. the timing for starting the engine torque change can be determined, however, the returning timing cannot be detected. Consequently, the engine torque down is continued for a long period of time, whereby, lowered power performance to a considerable extent occurs. Furthermore, in the hardware system of engine, there occurs a possibility of a trouble such as rise in the exhaust gas temperature for example. This is indicated by one-dot chain lines. In this case, even if failsafe of time out for the engine torque change time duration is provided, a temporarily lowered output shaft torque occurs as indicated by two-dot chain lines until the time out failsafe functions.

In the above ninth embodiment, the engine torque change control is stopped, however, the shifting is carried out rather early due to the lowered shift point as indicated by thick solid lines, whereby a workload of the frictionally engaging devices is included within the limits, and the durability of the frictionally engaging devices can be held satisfactory even if the engine torque change control is not carried out. Furthermore, the shift time duration can be included in a predetermined width (in accumulated area of the accumulator), and consequently, satisfactory shift characteristics can be achieved. Additionally, since monitoring of the engine rotary speed Ne is performed after the engine control computer 40 recognizes a shift output at the time "a", a possibility of failure can be lowered to an extreme extent as compared with that monitoring of the engine rotary speed Ne is always performed.

What is claimed is:

1. A system for integrally controlling an automatic transmission and an engine, wherein gear stages are automatically switched in accordance with shift points in a preset shift map, and an engine torque is changed by a predetermined change value during shifting to thereby maintain satisfactory shift characteristics, comprising:
   processor means for controlling the engine torque change by the predetermined change value during shifting, the processor means including
   means for determining whether conditions exist such that said engine torque cannot be changed in accordance with said predetermined change value; and
   means for regulating said engine torque change when said conditions are determined to exist, said regulating means including means for changing the shift points of said preset shift map to lower the shift points when the engine torque change is regulated.

2. The system as set forth in claim 1, further comprising:
   a sensor system for determining a timing for said engine torque change; and
   means for detecting malfunctions in said sensor system;
   wherein upon detection of a malfunction in said sensor system, conditions are determined to exist in said determining means such that said engine torque cannot be changed.

3. The system as set forth in claim 1, further comprising:
   means for detecting operating temperatures of said engine;
   wherein upon detection of a low operating temperature of said engine, conditions are determined to exist in said determining means such that said engine torque cannot be changed.

4. The system as set forth in claim 1, further comprising:
   means for counting the number of torque changes of said engine;
   wherein upon detection of the counted number of torque changes of said engine which exceeds a predetermined number of torque changes in a specific period of time, conditions are determined to exist in said determining means such that said engine torque cannot be changed.

5. The system as set forth in claim 1, further comprising:
   means for detecting an elapsed time after said engine torque change;
   wherein upon detection that an elapsed time after said engine torque change has not reached a predetermined time, conditions are determined to exist in said determining means such that said engine torque cannot be changed.

6. The system as set forth in claim 1, further comprising:
   means for detecting a time interval between said engine torque changes;
   wherein upon detection that engine torque changes at a time interval shorter than a predetermined period of time are continuously carried out a predetermined number, conditions are determined to exist in said determining means such that said engine torque cannot be changed.

7. The system as set forth in claim 1, further comprising:

means for determining whether or not said engine is overheated;

wherein upon detection of overheating of said engine, conditions are determined to exist in said determining means such that said engine torque cannot be changed.

8. The system as set forth in claim 7, wherein said means for determining whether or not said engine is overheated include means for determining whether or not engine cooling water temperature reaches a predetermined value.

9. The system as set forth in claim 1, wherein said means for regulating said engine torque change include means for prohibiting said engine torque change.

10. The system as set forth in claim 1, wherein said means for regulating said engine torque change include means for controlling said predetermined change value.

11. The system as set forth in claim 1, wherein said means for regulating said engine torque change include means for reducing a period of time for performing said engine torque change.

12. The system as set forth in claim 1, wherein said means for regulating said engine torque change include means for changing performing regions in various parameters for performing said engine torque change.

13. The system as set forth in claim 12, wherein one of said various parameters is an engine load.

14. The system as set forth in claim 12, wherein one of said various parameters is the type of shifting.

15. The system as set forth in claim 3, further comprising:

overdrive cancel means for prohibiting an overdrive when the temperature of said engine is low;

wherein said means for regulating said engine torque change include means responsive to a signal for prohibiting said overdrive.

16. The system as set forth in claim 1, further comprising:

means for issuing a warning when said engine torque change is regulated.

17. The system as set forth in claim 16, further comprising:

means for recognizing a reason why said engine torque cannot be changed in accordance with said predetermined change value;

wherein said means for issuing the warning issues a warning identifying said recognized reason.

18. The system as set forth in claim 1, wherein said means for changing shift points to lower shift points include means for selecting another shift map.

19. The system as set forth in claim 1, further comprising:

timer reasons for counting a predetermined period of time; and means for causing the regulation of said engine torque change to continue at least for said predetermined period of time.

20. The system for integrally controlling an automatic transmission and an engine as set forth in claim 1, further comprising:

means for controlling said engine;

means for controlling said automatic transmission, said automatic transmission control means being separate from said engine control means;

input means for inputting shift information from said automatic transmission control means to said engine control means, and means for performing engine torque change control, said inputting and performing means being formed integrally with said engine control means; and at least one of first and second information transmitting means, said first information transmitting means informing said automatic transmission control means that said engine torque change is stopped or restricted by said engine control means, and said second information transmitting means informing said engine control means that a signal sensor system for performing said engine torque change control has malfunctioned.

21. The system as set forth in claim 20, further comprising: means for issuing a warning responsive to information from one of said first and second information transmitting means.

* * * * *